United States Patent
Rakib

(10) Patent No.: US 9,866,363 B2
(45) Date of Patent: Jan. 9, 2018

(54) SYSTEM AND METHOD FOR COORDINATED MANAGEMENT OF NETWORK ACCESS POINTS

(71) Applicant: Cohere Technologies, Inc., Santa Clara, CA (US)

(72) Inventor: Selim Shlomo Rakib, Santa Clara, CA (US)

(73) Assignee: COHERE TECHNOLOGIES, INC.

( * ) Notice: Subject to any disclaimer, the term of this patent is extended or adjusted under 35 U.S.C. 154(b) by 0 days.

(21) Appl. No.: 15/187,668

(22) Filed: Jun. 20, 2016

(65) Prior Publication Data

US 2016/0380743 A1    Dec. 29, 2016

Related U.S. Application Data

(60) Provisional application No. 62/181,688, filed on Jun. 18, 2015.

(51) Int. Cl.
*H04W 40/00* (2009.01)
*H04L 5/00* (2006.01)
(Continued)

(52) U.S. Cl.
CPC .......... *H04L 5/0098* (2013.01); *H04B 7/04* (2013.01); *H04B 7/0413* (2013.01);
(Continued)

(58) Field of Classification Search
CPC ..... H04W 88/02; H04W 88/08; H04W 88/12; H04W 88/16; H04W 88/18; H04W 88/00; H04B 1/1027; H04B 1/707; H04B 7/0413
(Continued)

(56) References Cited

U.S. PATENT DOCUMENTS 4,754,493 A    6/1988 Coates
5,083,135 A    1/1992 Nagy et al.
(Continued)

FOREIGN PATENT DOCUMENTS

EP    1432168 A1    6/2004
JP    2011-127910    6/2011
(Continued)

OTHER PUBLICATIONS

International Search Report and Written Opinion for International Application No. PCT/US2016/030259, dated Aug. 4, 2016, 13 pages.
(Continued)

*Primary Examiner* — Jean Gelin
(74) *Attorney, Agent, or Firm* — Cooley LLP

(57) ABSTRACT

A method for coordinated wireless network management applicable to overlay network access points. The method includes sending, from an overlay access point of a plurality of overlay access points to a coordinator device, wireless operational parameters characterizing operation of the one of the plurality of overlay access points. The overlay access point receives suggested operational information provided by the coordinator device. The suggested operational information causes modification of a perceived value of at least one operational parameter of the one of the plurality of overlay access points wherein the perceived value is different from an actual value of the operational parameter. The method further includes adjusting an operational mode of the overlay access point based upon the perceived value. The adjusting may be further based at least in part upon a negotiation of wireless access parameters between the overlay access point and one or more local wireless devices.

22 Claims, 9 Drawing Sheets

(51) Int. Cl.
*H04B 7/06* (2006.01)
*H04B 7/04* (2017.01)
*H04B 7/0413* (2017.01)
*H04W 24/02* (2009.01)
*H04W 88/08* (2009.01)
*H04W 88/12* (2009.01)

(52) U.S. Cl.
CPC .......... *H04B 7/0617* (2013.01); *H04W 24/02* (2013.01); *H04W 88/08* (2013.01); *H04W 88/12* (2013.01)

(58) Field of Classification Search
USPC ......... 455/414.1, 443, 444, 450, 451, 452.1, 455/446
See application file for complete search history.

(56) References Cited

U.S. PATENT DOCUMENTS

| | | | |
|---|---|---|---|
| 5,182,642 A | 1/1993 | Gersdorff et al. |
| 5,623,511 A | 4/1997 | Bar-David et al. |
| 5,831,977 A | 11/1998 | Dent |
| 5,872,542 A | 2/1999 | Simons et al. |
| 5,956,624 A | 9/1999 | Hunsinger et al. |
| 6,212,246 B1 | 4/2001 | Hendrickson |
| 6,289,063 B1 | 9/2001 | Duxbury |
| 6,356,555 B1 | 3/2002 | Rakib et al. |
| 6,388,621 B1 | 5/2002 | Lynch |
| 6,426,983 B1 | 7/2002 | Rakib et al. |
| 6,608,864 B1 | 8/2003 | Strait |
| 6,631,168 B2 | 10/2003 | Izumi |
| 6,704,366 B1 | 3/2004 | Combes et al. |
| 6,956,814 B1 | 10/2005 | Campanella |
| 7,327,812 B2 | 2/2008 | Auer |
| 7,392,018 B1 | 6/2008 | Ebert et al. |
| 7,773,685 B2 | 8/2010 | Tirkkonen et al. |
| 7,864,877 B2 | 1/2011 | Hottinen |
| 8,229,017 B1 | 7/2012 | Lee et al. |
| 8,259,845 B2 | 9/2012 | Dent |
| 8,401,131 B2 | 3/2013 | Fety et al. |
| 8,547,988 B2 | 10/2013 | Hadani et al. |
| 8,619,892 B2 | 12/2013 | Vetter et al. |
| 8,879,378 B2 | 11/2014 | Rakib et al. |
| 8,892,048 B1 | 11/2014 | Turner |
| 8,976,851 B2 | 3/2015 | Hadani et al. |
| 9,031,141 B2 | 5/2015 | Hadani et al. |
| 9,071,285 B2 | 6/2015 | Hadani et al. |
| 9,071,286 B2 | 6/2015 | Hadani et al. |
| 9,083,483 B1 | 7/2015 | Rakib et al. |
| 9,083,595 B2 | 7/2015 | Rakib et al. |
| 9,130,638 B2 | 9/2015 | Hadani et al. |
| 9,282,528 B2 * | 3/2016 | Hashimoto | H04W 64/00 |
| 9,294,315 B2 | 3/2016 | Hadani et al. |
| 9,444,514 B2 | 9/2016 | Hadani et al. |
| 9,548,840 B2 | 1/2017 | Hadani et al. |
| 9,553,984 B2 * | 1/2017 | Krause | A61N 1/08 |
| 9,590,779 B2 | 3/2017 | Hadani et al. |
| 9,634,719 B2 | 4/2017 | Rakib et al. |
| 9,660,851 B2 | 5/2017 | Hadani et al. |
| 9,668,148 B2 | 5/2017 | Hadani et al. |
| 9,712,354 B2 | 7/2017 | Hadani et al. |
| 2001/0031022 A1 | 10/2001 | Petrus et al. |
| 2001/0033614 A1 | 10/2001 | Hudson |
| 2001/0046205 A1 | 11/2001 | Easton et al. |
| 2002/0001308 A1 | 1/2002 | Heuer |
| 2002/0034191 A1 | 3/2002 | Shattil |
| 2002/0181388 A1 | 12/2002 | Jain et al. |
| 2002/0181390 A1 | 12/2002 | Mody et al. |
| 2002/0181607 A1 | 12/2002 | Izumi |
| 2003/0073464 A1 | 4/2003 | Giannakis et al. |
| 2003/0185295 A1 | 10/2003 | Yousef |
| 2004/0044715 A1 | 3/2004 | Aldroubi et al. |
| 2004/0174812 A1 | 9/2004 | Murakami et al. |
| 2004/0189581 A1 | 9/2004 | Sako et al. |
| 2004/0218523 A1 | 11/2004 | Varshney et al. |
| 2005/0157778 A1 | 7/2005 | Trachewsky et al. |
| 2005/0157820 A1 | 7/2005 | Wongwirawat et al. |
| 2005/0180517 A1 | 8/2005 | Abe |
| 2005/0207334 A1 | 9/2005 | Hadad |
| 2005/0251844 A1 | 11/2005 | Martone et al. |
| 2006/0008021 A1 | 1/2006 | Bonnet |
| 2006/0039270 A1 | 2/2006 | Strohmer et al. |
| 2007/0014272 A1 | 1/2007 | Palanki et al. |
| 2007/0038691 A1 | 2/2007 | Candes et al. |
| 2007/0078661 A1 | 4/2007 | Sriram et al. |
| 2007/0104283 A1 | 5/2007 | Han et al. |
| 2007/0110131 A1 | 5/2007 | Guess et al. |
| 2007/0211952 A1 | 9/2007 | Faber et al. |
| 2007/0253465 A1 | 11/2007 | Muharemovic et al. |
| 2007/0253504 A1 | 11/2007 | Hasegawa |
| 2008/0043857 A1 | 2/2008 | Dias et al. |
| 2008/0117999 A1 | 5/2008 | Kadous et al. |
| 2008/0186843 A1 | 8/2008 | Ma et al. |
| 2008/0187062 A1 | 8/2008 | Pan et al. |
| 2008/0232504 A1 | 9/2008 | Ma et al. |
| 2008/0310383 A1 | 12/2008 | Kowalski |
| 2009/0080403 A1 * | 3/2009 | Hamdi | H04W 28/22 370/345 |
| 2009/0092259 A1 | 4/2009 | Jot et al. |
| 2009/0103593 A1 | 4/2009 | Bergamo |
| 2009/0122854 A1 | 5/2009 | Zhu et al. |
| 2009/0161804 A1 | 6/2009 | Chrabieh et al. |
| 2009/0204627 A1 | 8/2009 | Hadani |
| 2009/0222226 A1 | 9/2009 | Baraniuk et al. |
| 2009/0303961 A1 | 12/2009 | Popovic et al. |
| 2010/0008432 A1 | 1/2010 | Kim et al. |
| 2010/0027608 A1 | 2/2010 | Priotti |
| 2010/0111138 A1 | 5/2010 | Hosur et al. |
| 2010/0142476 A1 | 6/2010 | Jiang et al. |
| 2010/0187914 A1 | 7/2010 | Rada et al. |
| 2010/0238787 A1 | 9/2010 | Guey |
| 2010/0277308 A1 * | 11/2010 | Potkonjak | H04W 28/18 340/539.12 |
| 2010/0303136 A1 | 12/2010 | Ashikhmin et al. |
| 2010/0322349 A1 | 12/2010 | Lee et al. |
| 2011/0007789 A1 | 1/2011 | Garmany |
| 2011/0110532 A1 | 5/2011 | Svendsen |
| 2011/0116489 A1 * | 5/2011 | Grandhi | H04W 16/04 370/338 |
| 2011/0116516 A1 | 5/2011 | Hwang et al. |
| 2011/0126071 A1 | 5/2011 | Han et al. |
| 2011/0131463 A1 | 6/2011 | Gunnam |
| 2011/0216808 A1 | 9/2011 | Tong et al. |
| 2011/0286502 A1 | 11/2011 | Adachi et al. |
| 2011/0287778 A1 | 11/2011 | Levin et al. |
| 2011/0292971 A1 | 12/2011 | Hadani et al. |
| 2011/0293030 A1 | 12/2011 | Rakib et al. |
| 2011/0299379 A1 | 12/2011 | Sesia et al. |
| 2011/0305267 A1 | 12/2011 | Rius et al. |
| 2012/0021769 A1 | 1/2012 | Lindoff et al. |
| 2012/0051457 A1 | 3/2012 | Ma et al. |
| 2012/0140716 A1 | 6/2012 | Baldemair et al. |
| 2012/0170684 A1 | 7/2012 | Yim et al. |
| 2012/0201322 A1 | 8/2012 | Rakib et al. |
| 2012/0213098 A1 | 8/2012 | Sun |
| 2012/0235795 A1 | 9/2012 | Liao et al. |
| 2012/0269201 A1 | 10/2012 | Atungsiri et al. |
| 2012/0320994 A1 | 12/2012 | Loghin et al. |
| 2013/0021977 A1 | 1/2013 | Yang et al. |
| 2013/0058390 A1 | 3/2013 | Haas et al. |
| 2013/0077579 A1 * | 3/2013 | Cho | H04W 4/20 370/329 |
| 2013/0083661 A1 * | 4/2013 | Gupta | H04W 28/0215 370/235 |
| 2013/0121497 A1 | 5/2013 | Smaragdis et al. |
| 2013/0230010 A1 * | 9/2013 | Kim | H04W 52/146 370/329 |
| 2013/0260787 A1 * | 10/2013 | Hashimoto | H04W 64/00 455/456.1 |
| 2013/0279627 A1 | 10/2013 | Wu et al. |
| 2014/0143639 A1 | 5/2014 | Loghin et al. |
| 2014/0161154 A1 | 6/2014 | Hadani et al. |
| 2014/0169385 A1 | 6/2014 | Hadani et al. |

(56) References Cited

U.S. PATENT DOCUMENTS

| | | | |
|---|---|---|---|
| 2014/0169406 A1 | 6/2014 | Hadani et al. | |
| 2014/0169433 A1 | 6/2014 | Hadani et al. | |
| 2014/0169436 A1 | 6/2014 | Hadani et al. | |
| 2014/0169437 A1 | 6/2014 | Hadani et al. | |
| 2014/0169441 A1 | 6/2014 | Hadani et al. | |
| 2014/0247803 A1 | 9/2014 | Arambepola et al. | |
| 2014/0348252 A1 | 11/2014 | Siohan et al. | |
| 2014/0364128 A1* | 12/2014 | Lee | H04W 36/18 455/442 |
| 2015/0117395 A1 | 4/2015 | Hadani et al. | |
| 2015/0326273 A1 | 11/2015 | Rakib et al. | |
| 2015/0327085 A1 | 11/2015 | Hadani et al. | |
| 2015/0382231 A1* | 12/2015 | Jabbar | H04W 24/08 370/230 |
| 2016/0043835 A1 | 2/2016 | Hadani et al. | |
| 2016/0135132 A1* | 5/2016 | Donepudi | H04W 4/025 370/311 |
| 2016/0182269 A1 | 6/2016 | Hadani et al. | |
| 2016/0191217 A1 | 6/2016 | Hadani et al. | |
| 2016/0191280 A1 | 6/2016 | Hadani et al. | |
| 2016/0254889 A1 | 9/2016 | Shattil | |
| 2016/0277225 A1 | 9/2016 | Frenne et al. | |
| 2016/0309345 A1* | 10/2016 | Tehrani | H04W 16/02 |
| 2016/0381576 A1 | 12/2016 | Hadani et al. | |
| 2017/0012749 A1 | 1/2017 | Rakib et al. | |
| 2017/0012810 A1 | 1/2017 | Rakib et al. | |
| 2017/0019297 A1 | 1/2017 | Rakib | |
| 2017/0033899 A1 | 2/2017 | Rakib et al. | |
| 2017/0040711 A1 | 2/2017 | Rakib et al. | |
| 2017/0078054 A1 | 3/2017 | Hadani et al. | |
| 2017/0099122 A1 | 4/2017 | Hadani et al. | |
| 2017/0099607 A1 | 4/2017 | Hadani et al. | |
| 2017/0149594 A1 | 5/2017 | Rakib | |
| 2017/0149595 A1 | 5/2017 | Rakib et al. | |
| 2017/0201354 A1 | 7/2017 | Hadani et al. | |

FOREIGN PATENT DOCUMENTS

| | | |
|---|---|---|
| WO | WO 2007/004297 | 1/2007 |
| WO | WO 2011/137699 A1 | 11/2011 |
| WO | WO 2011/150315 A3 | 12/2011 |
| WO | WO 2013/148546 A1 | 10/2013 |
| WO | WO 2014/004585 | 1/2014 |
| WO | WO 2016/014596 | 1/2016 |
| WO | WO 2016/014598 | 1/2016 |
| WO | WO 2016/176642 | 11/2016 |
| WO | WO 2016/183230 | 11/2016 |
| WO | WO 2016/183240 | 11/2016 |
| WO | WO 2016/209848 | 12/2016 |
| WO | WO 2017/003952 | 1/2017 |
| WO | WO 2017/011478 | 1/2017 |

OTHER PUBLICATIONS

International Search Report and Written Opinion for International Application No. PCT/US2016/031928, dated Oct. 7, 2016, 10 pages.
Office Action for U.S. Appl. No. 14/605,957, dated Jun. 22, 2017, 6 pages.
International Search Report and Written Opinion for International Application No. PCT/US2017/025797, dated Jun. 21, 2017, 6 pages.
Office Action for U.S. Appl. No. 15/152,464, dated Apr. 6, 2017, 10 pages.
Office Action for U.S. Appl. No. 15/188,946, dated May 8, 2017, 14 pages.
Office Action for U.S. Appl. No. 15/194,494, dated May 5, 2017, 16 pages.
Office Action for U.S. Appl. No. 15/436,653, dated Jun. 2, 2017, 10 pages.
Office Action for U.S. Appl. No. 13/117,119, dated Aug. 5, 2013.
Notice of Allowance for U.S. Appl. No. 13/117,119, dated Feb. 28, 2014.
International Search Report and Written Opinion for International Application No. PCT/US2011/038302, dated Nov. 15, 2011.
International Preliminary Report on Patentability for International Application No. PCT/US2011/038302, dated Jun. 4, 2012.
Office Action for U.S. Appl. No. 13/117,124, dated Feb. 22, 2013.
Notice of Allowance for U.S. Appl. No. 13/117,124 dated Aug. 8, 2013.
Examination Report for Australian Application No. 2013280487, dated May 2, 2016.
Supplementary European Search Report for European Application No. 13809004.8, dated Apr. 14, 2016, 8 pages.
Office Action for Japanese Application No. 2015-518647, dated Jul. 7, 2015, 10 pages.
Notice of Allowance for U.S. Appl. No. 13/927,087, dated Feb. 25, 2015.
Office Action for U.S. Appl. No. 13/927,087, dated Nov. 12, 2014.
International Search Report and Written Opinion for International Application No. PCT/US2013/047723 dated Oct. 29, 2013.
International Preliminary Report on Patentability for International Application No. PCT/US2013/047723 dated Dec. 31, 2014.
Notice of Allowance for U.S. Appl. No. 13/927,088, dated Feb. 18, 2015.
Office Action for U.S. Appl. No. 13/927,088, dated Nov. 28, 2014.
Notice of Allowance for U.S. Appl. No. 13/927,086, dated Dec. 26, 2014.
Notice of Allowance for U.S. Appl. No. 13/927,086, dated Mar. 19, 2015.
Office Action for U.S. Appl. No. 13/927,086, dated Oct. 14, 2014.
Office Action for U.S. Appl. No. 13/927,089, dated Dec. 24, 2014.
Office Action for U.S. Appl. No. 13/927,089, dated Aug. 14, 2015, 7 pages.
Supplemental Notice of Allowability for U.S. Appl. No. 13/927,091 dated Jun. 11, 2015.
Notice of Allowance for U.S. Appl. No. 13/927,091 dated Apr. 24, 2015.
Office Action for U.S. Appl. No. 13/927,091 dated Jan. 27, 2015.
Office Action for U.S. Appl. No. 13/927,092 dated Oct. 8, 2014.
Notice of Allowance for U.S. Appl. No. 13/927,092 dated Oct. 24, 2014.
Office Action fpr U.S. Appl. No. 13/927,095, dated Apr. 30, 2015, 11 pages.
Office Action fpr U.S. Appl. No. 13/927,095, dated Nov. 4, 2015, 9 pages.
Office Action for U.S. Appl. No. 13/927,095, dated Jun. 1, 2016, 10 pages.
Office Action for U.S. Appl. No. 14/717,886, dated Apr. 19, 2016, 10 pages.
Office Action for U.S. Appl. No. 14/709,377, dated Dec. 11, 2015, 12 pages.
Office Action for U.S. Appl. No. 14/709,377, dated Jul. 13, 2016, 17 pages.
Office Action for U.S. Appl. No. 14/754,596, dated Apr. 19, 2016, 18 pages.
Office Action for U.S. Appl. No. 14/809,129, dated Jul. 19, 2016, 5 pages.
Patent Examination Report No. 1 for Australian Application No. 2013239970, dated Dec. 8, 2015, 3 pages.
Supplementary European Search Report for European Application No. 13768150.8, dated Oct. 30, 2015, 7 pages.
International Search Report and Written Opinion for International Application No. PCT/US2013/033652, dated Jun. 12, 2013.
"AT&T Investor Report," 2014. [Online]. Available: http://www.att.com/Investor/ATT_Annual/2014/att_introduces_new_concepts_for_telecom_network.html.
Banelli, P. et al., "Modulation Formats and Waveforms for 5G Networks: Who Will Be the Heir of OFDM?," IEEE Signal Processing Magazine, pp. 80-93, 2014.
Catt, "UL Ackinack transmission methods for LTE-A", 3GPP Draft; RAN WG1 R1-102453, Apr. 7, 2010 (Apr. 7, 2010), Beijing, China, XP050419703.
Gurevich et al. "Group Representation Design of Digital Signals and Sequences", S.W. Golomb et al. (Eds.): SETA2008, LNCS 5203, pp. 153-166 (2008).

(56) References Cited

OTHER PUBLICATIONS

Holma, H. et al., "LTE for UMTS—OFDMA and SCFDMA Based Radio Access". Jan. 1, 2009 (Jan. 1, 2009 ), John Wiley & Sons, United Kingdom, XP002728837. See pp. 83-135.
Mecklenbrauker, W., "A Tutorial on Non-Parametric Bilinear Time-Frequency Signal Representations," Time and Frequency Representation of Signals and Systems (Eds. G Longo and B. Picinbono), vol. 309, pp. 11-68, 1989.
Nehorai et al., "MURI: Adaptive waveform design for full spectral dominance," [online], Mar. 11, 2011, Retrieved on May 11, 2013, Retrieved from the Internet <URL: httb://oai.dtic.mil/oai/oai?verb=getRecord&metadataPrefix=html&identifier=ADA565420>.
Rachid, J. E. et al., "NGMN 5G Initiative White Paper," Feb. 17, 2015. [Online]. Available: https://www.ngmn.org/uploads/media/NGMN_5G_White_Paper_V1_0.pdf.
Rusek, F. et al., "Scaling Up MIMO, Opportunities and Challenges with Very Large Arrays," IEEE Signal Processing Magazine, pp. 40-60, 2013.
Vodafone, "Cellular Internet of Things: Architectural Aspects," in 3GPP RAN#68, Malmo, Sweden, 2015.
Supplementary European Search Report for European Application No. 11787483.4, dated Sep. 9, 2014, 6 pages.
Communication Pursuant to Article 94(3) EPC for European Application No. 13809004.8, dated Feb. 17, 2017, 5 pages.
International Search Report and Written Opinion for International Application No. PCT/US2016/050825, dated Feb. 8, 2017, 12 pages.
International Search Report and Written Opinion for International Application No. PCT/US2016/052524, dated Dec. 20, 2016, 8 pages.
International Search Report and Written Opinion for International Application No. PCT/US2016/038584, dated Sep. 26, 2016, 8 pages.
International Search Report and Written Opinion for International Application No. PCT/US2016/031909, dated Aug. 11, 2016, 13 pages.
International Search Report and Written Opinion for International Application No. PCT/US2016/039662, dated Nov. 29, 2016, 14 pages.
International Search Report and Written Opinion for International Application No. PCT/US2016/041940, dated Oct. 20, 2016, 8 pages.
International Search Report and Written Opinion for International Application No. PCT/US2015/041417, dated Oct. 1, 2015, 7 pages.
Office Action for U.S. Appl. No. 14/805,407, dated Dec. 14, 2016, 7 pages.
International Search Report and Written Opinion for International Application No. PCT/US2015/041420, dated Oct. 1, 2015, 6 pages.
Office Action for U.S. Appl. No. 15/617,962, dated Sep. 6, 2017, 10 pages.
Office Action for U.S. Appl. No. 15/374,995, dated Aug. 7, 2017, 6 pages.
Office Action for U.S. Appl. No. 15/208,545, dated Aug. 21, 2017, 15 pages.

* cited by examiner

SYSTEM AND METHOD FOR COORDINATED MANAGEMENT OF NETWORK ACCESS POINTS

CROSS-REFERENCE TO RELATED APPLICATIONS

The present application claims the benefit of priority under 35 U.S.C. §119(e) of U.S. Provisional Application No. 62/181,688, entitled SYSTEM AND METHOD FOR COORDINATED MANAGEMENT OF NETWORK ACCESS POINTS FOR UNLICENSED RADIOFREQUENCY SPECTRUM, filed Jun. 18, 2015, which is incorporated herein by reference for all purposes.

FIELD

This disclosure generally relates to wireless communication protocols and methods, and more particularly relates to methods for wireless communication supported by network access points.

BACKGROUND

Although most of the frequency spectra capable of supporting wireless communications is regulated by various governments and is subject to licensing or permitting, certain frequency ranges have been designated as being unlicensed spectrum. In these "unlicensed" bands, low-energy operation (typically 1 Watt or less, and often 100 mW or less) is permitted without a license. At least some of these bands may also be referred to as the industrial, scientific, and medical equipment (ISM) bands, and in the U.S. include the ranges of 902 to 928 MHz, 2.4 to 2.4835 GHz, and 5.725 to 5.875 GHz. Other frequency ranges, such as 24 GHz and 60 GHz are also available for unlicensed use as well. Additional frequency ranges, such as 802.11af operating in the 470-710 MHz range, and 802.11ad, operating in the 57-64 GHz range are also presently being developed.

Such unlicensed spectrum has sparked a revolution in wireless technology, and multiple popular wireless technologies, such as Bluetooth™ (IEEE 802.15 type standards), Wi-Fi (IEEE 802.11 type standards), and other present and emerging wireless technologies would not have been feasible without the existence of such unlicensed spectrum.

Many different types of devices, including common household appliances such as Microwave ovens, RFID tags, remote control devices, security systems, Bluetooth devices, ZigBee devices, and the like operate in the ISM frequency ranges. Thus, various standards for allowing different wireless devices to both connect with each other, as well as to try to avoid interfering with each other, have evolved. For example, the standards relating to Wi-Fi include interference mitigation features.

Commercial deployments of Wi-Fi typically occupy (exclusive of guard bands) swaths of bandwidth of roughly 80 MHz in the 2.4 GHz, range (often configured in the US as eleven contiguous 20-MHz-wide and often overlapping channels with 5 MHz separation between the various channels). In the "5.8" GHz range, more bandwidth is allowed, occasionally according to a more complex and non-contiguous scheme.

In the 5.8 GHz region, originally 8 approximately 20 MHz wide channels (160 MHz bandwidth total) were allowed between 5.17 to 5.33 GH, 4 approximately 20 MHz wide channels are allowed starting at 5.49 GHz (80 MHz bandwidth total), 4 approximately 20 MHz wide channels (80 MHz bandwidth total) terminating at 5.725 GHz, and 5 approximately 20 MHz wide channels (100 MHz total) were starting at 5.735 GHz.

The U.S. now has a more unified and contiguous scheme where 37, 20-MHz non-overlapping channels are allocated between 5.17 to 5.925 GHz. If the appropriate frequencies are available for use locally, these 20 MHz wide channels can be pooled together to form larger and higher data rate carrying 40 MHz wide, 80 MHz wide, and even 160 MHz wide channels. Other countries have slightly different schemes in this region. Here this range of frequencies will be referred to generically, unless otherwise specified, as the "5.8 GHz" range.

In contrast to the very limited amount of bandwidth that was allocated to the 2.4 GHz region, substantially more bandwidth was allocated for data communication in the 5.8 GHz region. However at a given power level, the distance (range) that a given 2.4 GHz wireless signal can travel through a typical home or urban environment can be roughly twice as far as the range of an 5.8 GHz wireless signal. Thus, although Wi-Fi devices using 2.4 GHz wireless signals may be more prone to in-band interference than 5.8 GHz devices, in the absence of channel congestion a 2.4 GHz devices can have a significantly longer range than a corresponding 5.8 GHz device.

Various Wi-Fi standards, exemplified by standards such as 802.11n or 802.11acm generally allow for a Wi-Fi access point (i.e. a Wi-Fi transceiver, and potentially also a router, having a connection to a larger network such as the Internet) to announce its existence to other local Wi-Fi capable wireless devices by use of periodically transmitted beacon frames. These beacon frames transmit information about that access point, such as the access point timestamp, network capability, access service set identifier (SSID) and various other wireless parameters used by that access point. Such Wi-Fi standards also allow Wi-Fi access points and other Wi-Fi wireless devices to communicate with each other, and automatically negotiate various wireless parameters (e.g. frequencies used, data rates, modulation schemes, and the like). The standards also allow for two nearby Wi-Fi access points to automatically negotiate, to a limited extent, channel use between themselves in order to minimize interference.

In this negotiation process, the various devices involved will often keep track of various types of error rates in the exchange of various wireless data packets, and will often seek to automatically adjust various types of wireless parameters so as to minimize these error rates. Other schemes include various types of Clear-Channel Assessment (CCA) tests in which the device checks to see if a given channel is idle before transmitting, and if busy defers transmission. Still other schemes include wireless signal energy assessments and broad channel (e.g. 40 MHz) intolerance bits, which instruct nearby Wi-Fi devices to only use narrow channel (e.g. 20 MHz transmission), and the like.

For MIMO equipped Wi-Fi access points and suitable wireless devices, MIMO beamforming methods can include applying various steering matrices to steer the direction of a given wireless beam, along with various channel sounding methods such as null data packet methods. These null data packet methods, for example, operate by the use of special null data packet announcement frames and null data packet frames that an access point can send to a recipient device, and the recipient device in turn can report back information, such as a feedback matrix, that lets the access point know what MIMO beam steering direction is most favorable. The access point can then use this most favorable MIMO beam direction for subsequent communication with that particular recipient device. See, e.g., IEEE Std. 802.11n-2009, Oct. 29, 2009, published by IEEE, 3 Park Avenue, New York, and IEEE Std. 802.11ac-2013, December 2013, also published by IEEE, 3 Park Avenue, New York.

SUMMARY

In one aspect the disclosure pertains to a system and method of optimizing network access points for unlicensed spectrum purposes, such as improved Wi-Fi access points. The system may include a plurality of local network overlay access points configured to send information pertaining to their various present wireless operational parameters to a remote coordinator device. The coordinator device typically knows the spatial position of the various overlay access points and is able to develop a broader perspective or model of the various wireless communication modes by which the access points are communicating with various local wireless devices. Using this model, the coordinator device may identify areas where alternative wireless parameters could produce superior results. Based upon this model, the coordinator device may determine, and provide to the overlay access points, appropriate instructions relating to such alternative wireless parameters in order to achieve the superior results. These techniques can be used with a variety of different wireless protocols and standards, and if desired can be made backward compatible with existing standards such as, for example, Wi-Fi standards.

Aspects of the present disclosure are based in part upon the insight that conventional schemes for wireless data communications over unlicensed spectrum using access points tend not to have access to, or utilize, any information concerning the local environments of the access points, except for local environmental information which the access points can directly sense. As a consequence, conventional approaches for interference mitigation have tended to assume that, at least for unlicensed spectrum, the various access points and devices are competing in a "free for all" environment rather than being amenable to some sort of intelligent control.

Although rules have been created to allow at least a limited degree of coordination between nearby units, existing schemes for managing the use by access points of unlicensed spectrum otherwise lacked overall intelligence and coordination. For example, neighboring Wi-Fi access points will generally operate on a relatively blind "first to claim basis". In this approach, various clear channel assessment (CCA) tests, broad channel intolerance bits, and the like, allocate priority to the device first claiming a range of channels, irrespective of whether other channel assignments may produce more desirable Wi-Fi connections for both access points. Such approaches may be workable but are generally result in a suboptimal allocation of resources from a network-wide perspective.

The disclosed systems and methods for coordinated management of network access points, which may be semi-autonomous, leverage the fact that local access points are typically connected to larger networks such as the Internet. In addition, although some access points are mobile (for example access points built into smartphones), it is observed that many access points remain in a stationary position with a defined orientation and location for long periods of time. Further, those access points that are mobile, such as access points built into smartphones, are also frequently coupled to GPS receivers and accelerometers. Thus, the present position and orientation of most mobile access points can often also be determined as well.

In general terms, the disclosed systems and methods contemplate that access points in a given region may use their connection to larger networks to report their locations and wireless operating conditions to a coordinator device. This information may be saved by the coordinator device in a database and subsequently used to better manage the operation of these various access points.

To do this, a new type of access point, here called an overlay access point (OAP), is disclosed. This overlay access point reports at least its present wireless operational parameters, and often its location as well, over the network to a new type of manager device, here called a coordinator device (CD). As for all unlicensed spectrum access points, such as Wi-Fi access points, these OAP are also network access points configured to connect to at least one network such as the Internet, and to use wireless signals operating at one or more unlicensed radio spectrum frequency range to provide network connectivity to various other local wireless devices.

The coordinator device may use its knowledge of the overall situation (e.g. the positions and properties of a number of locally operating OAP devices) to assess if the various OAP devices are operating in an optimal manner. In some embodiments the coordinator device (CD) effectively acts as an intelligent supervisor for other unlicensed spectrum devices. Although in some cases the individual unlicensed spectrum devices may often try to individually and locally negotiate wireless operational parameters between themselves, in the event that some of these individual and local negotiations appear suboptimal in the broader sense, the coordinator device (CD) may suggest or require the use of alternative parameters.

Thus in addition to reporting their present wireless operational parameters to the CD, these OAPs may also be configured to receive commands or suggestions from the coordinator device (CD) as to how to better configure their wireless operational states on a going forward basis.

In certain embodiments the OAP devices may be configured to be partially or fully backward compatible with legacy devices such as Wi-Fi access points or, for example, Bluetooth, ZigBee or LTE devices. However, in other embodiments, the OAP devices are not so backward compatible. In other embodiments, the OAP devices may operate in accordance with other types of wireless standards or non-standardized operational modes. Thus, in some embodiments backward compatibility with legacy access points can be achieved by configuring the overlay access points (OAPs) to be both backward compatible with legacy operation (i.e. capable of automatically negotiating wireless operational parameters with local legacy devices according to at least some of legacy unlicensed spectrum standards) and capable of responding, to a greater or lesser extent, to commands, suggestions, or hints from the coordinator devices (CD). The coordinator devices can also receive information regarding the position and properties of any local legacy access points as well, and use information regarding such legacy access points when formulating commands, suggestions, or hints for the various OAPs.

Thus, in some embodiments, the disclosure is directed to a system, method, OAPs, and a CD for optimizing the performance of a plurality of overlay access points. These techniques will generally operate by using at least one coordinator device to obtain various present wireless operational parameters from various overlay access points (OAPs), often by communication over a network such as the Internet. That is, the OAPs, which are typically equipped with their own processors, will, either automatically, or in response to queries from a CD device, send to the CD device data packets reporting on the OAPs present wireless operational parameters.

The coordinator device(s) or CD(s) will generally comprise at least one processor and memory, and will be configured to receive these present wireless operational parameter data packets from the OAPs, and to store this data in memory so that the various present wireless parameters can be used in one or more models (e.g. computer models stored in computer memory) representative of the local wireless environment of an OAP. For example, these one or more models will often be based upon knowledge of both the relative positions of the various OAPs within a given location and the present wireless communications modes used by these various OAP devices.

The coordinator device (CD) may be configured to use information from the model(s) to create at least one theory of at least one preferred future wireless operational state of the one or more OAPs. This theory may provide indications of how the various OAPs can operate more efficiently (e.g. provide better wireless network connectivity to their various local wireless devices). To do this, the CD will generally be configured with software algorithms premised upon rules of efficient operation.

After determining such a theory, the coordinator device (CD) will then (as needed) provide at least some suggested future wireless operational parameters to one or more of the various OAP to which the CD is wirelessly connected. Often at least some of these various present or future wireless channel access parameters will vary according to a given OAP's local environment (e.g. where the various wireless devices are located, and the signals that the various wireless devices are transmitting and receiving).

As previously discussed, these OAPs may be configured to negotiate or configure present wireless channel access parameters with various other local wireless devices, and other local overlay access points, and to provide network connectivity to at least some of the other various local wireless devices. In some embodiments, the OAPs perform this function even in the absence of any suggestions from the CD by, for example, following various unlicensed spectrum device negotiating rules.

In one embodiment, an OAP does not interpret the future wireless operational parameters received from a CD as strict commands. Instead, in certain operational modes the OAP may interpret these future wireless operational parameters as suggestions or hints, and try to both continue to semi-autonomously negotiate wireless parameters with local device while simultaneously reconciling this local negotiation with the input from the OAP. As will be discussed, one way that this can be done is to use the received future wireless operational parameters to increase a probability of that the OAP will operate according to the OAP's theory of what is best, while still maintaining a rapid ability to quickly adjust to changes in local conditions that may occur too rapidly for a remote CD device to efficiently manage.

In summary, one aspect of the disclosure is directed to a method for coordinated wireless network management. The method includes sending, from an overlay access point of a plurality of overlay access points to a coordinator device, wireless operational parameters characterizing operation of the one of the plurality of overlay access points. The overlay access point receives suggested operational information provided by the coordinator device. The suggested operational information causes modification of a perceived value of at least one operational parameter of the one of the plurality of overlay access points wherein the perceived value is different from an actual value of the operational parameter. The method further includes adjusting an operational mode of the overlay access point based upon the perceived value. In one implementation the adjusting is further based at least in part upon a negotiation of wireless access parameters between the overlay access point and one or more local wireless devices.

The operational parameter may be a semi-random or random wireless channel access parameter. In this case the overlay access point may use the suggested operational information to create a bias in the wireless channel access parameter, thereby causing the modification of the perceived value. The bias may correspond to, for example, an increase or a decrease in perceived noise or error rates associated with wireless transmission or reception of signals.

The overlay access point may comprise a MIMO overlay access point including a plurality of antennas configured to produce a plurality of adjustable beam directions. The plurality of antennas are configured to produce one of the plurality of adjustable beam directions in response to MIMO configuration parameters included within the suggested operational information. The method may further include receiving additional MIMO configuration parameters provided by the coordinator device, the plurality of antennas shifting the one of the plurality of adjustable beam directions in response to the additional MIMO configuration parameters so as to at least one of: (i) reduce interference with at least one of another of the plurality of local overlay access points, and (ii) improve signal strength to at least one local wireless device. Alternatively or in addition, the method may include receiving additional MIMO configuration parameters provided by the coordinator device, the plurality of antennas shifting the one of the plurality of adjustable beam directions in response to the additional MIMO configuration parameters so as to intersect with a beam produced by another of the plurality of local overlay access points proximate a probable location of a local wireless device wherein the one of the plurality of overlay access points and the another of the plurality of local overlay access points cooperate to provide network connectivity to the local wireless device.

In one implementation the coordinator device is in the form of a remote server in communication with the plurality of overlay access points over corresponding wired or wireless connections.

In another aspect the disclosure pertains to a method for coordinated wireless network management. The method includes receiving, at a coordinator device from a plurality of overlay access points, wireless operational parameters characterizing wireless operation of the plurality of overlay access points. The coordinator device may generate, based upon the wireless operational parameters, suggested operational information for an overlay access point included within the plurality of overlay access points. The method includes sending, to the overlay access point, the suggested operational information wherein the suggested operational information causes modification of a perceived value of at least one operational parameter of the overlay access point, the perceived value being different from an actual value of the at least one operational parameter. An operational mode of the at least one of the plurality of overlay access points may then be adjusted based at least in part upon the perceived value.

The operational mode of the overlay access point may be further adjusted based at least in part upon a negotiation of wireless access parameters between the overlay access point and one or more local wireless devices, the negotiation being influenced by the perceived value of the operational parameter. In one implementation the operational parameter is a random or semi-random wireless channel access parameter. In this case the suggested operational information may create a bias in the wireless channel access parameter and thereby cause the modification of the perceived value. The bias may correspond to an increase or a decrease in perceived noise or error rates associated with wireless transmission or reception of signals.

The suggested operational information may be further generated based upon other wireless operational parameters associated with one or more local wireless devices, the plurality of overlay access points providing network connectivity to the one or more local wireless devices.

In one exemplary case the overlay access point is a MIMO overlay access point including a plurality of antennas configured to produce a plurality of adjustable beam directions, the plurality of antennas producing one of the plurality of adjustable beam directions in response to MIMO configuration parameters included within the suggested operational information. In this case the coordinator device is configured to send additional MIMO configuration parameters. The plurality of antennas are configured to shift the one of the plurality of adjustable beam directions in response to the additional MIMO configuration parameters so as to at least one of: (i) reduce interference with at least one of another of the plurality of local overlay access points, and (ii) improve signal strength to at least one local wireless device. Alternatively or in addition, the adjustable beam directions may be shifted in response to the additional MIMO configuration parameters so as to intersect with a beam produced by another of the plurality of local overlay access points proximate a probable location of a local wireless device.

The disclosure also pertains to an overlay access point included within a plurality of overlay access points configured for communication with a coordinator device. The overlay access point includes a processor, a network communication unit in communication with the processor, and a memory coupled to the processor. The memory includes program code which when executed by the processor causes the processor to send, to the coordinator device, wireless operational parameters characterizing operation of the overlay access point. The program code further causes the processor to receive suggested operational information provided by the coordinator device wherein the suggested operational information causes modification of a perceived value of at least one operational parameter of the overlay access point wherein the perceived value is different from an actual value of the operational parameter. The processor is further configured by the program code to adjust an operational mode of the overlay access point based upon the perceived value.

The disclosure is also directed to a coordinator device configured for communication with a plurality of overlay access points. The coordinator device may include a processor, a network communication unit in communication with the processor, memory coupled to the processor. The memory may include program code which when executed by the processor causes the processor to: (i) receive, from the plurality of overlay access points, wireless operational parameters characterizing wireless operation of the plurality of overlay access points, (ii) generate, based upon the wireless operational parameters, suggested operational information for at least one of the plurality of overlay access points wherein the suggested operational information causes modification of a perceived value of at least one operational parameter of the at least one of the plurality of overlay access points wherein the perceived value is different from an actual value of the at least one operational parameter, and (iii) send, to the at least one of the plurality of overlay access points, the suggested operational information. An operational mode of the at least one of the plurality of overlay access points is adjusted based at least in part upon the perceived value.

BRIEF DESCRIPTION OF THE DRAWINGS

For a better understanding of the nature and objects of various embodiments of the invention, reference should be made to the following detailed description taken in conjunction with the accompanying drawings, wherein.

DETAILED DESCRIPTION

Figure 1:
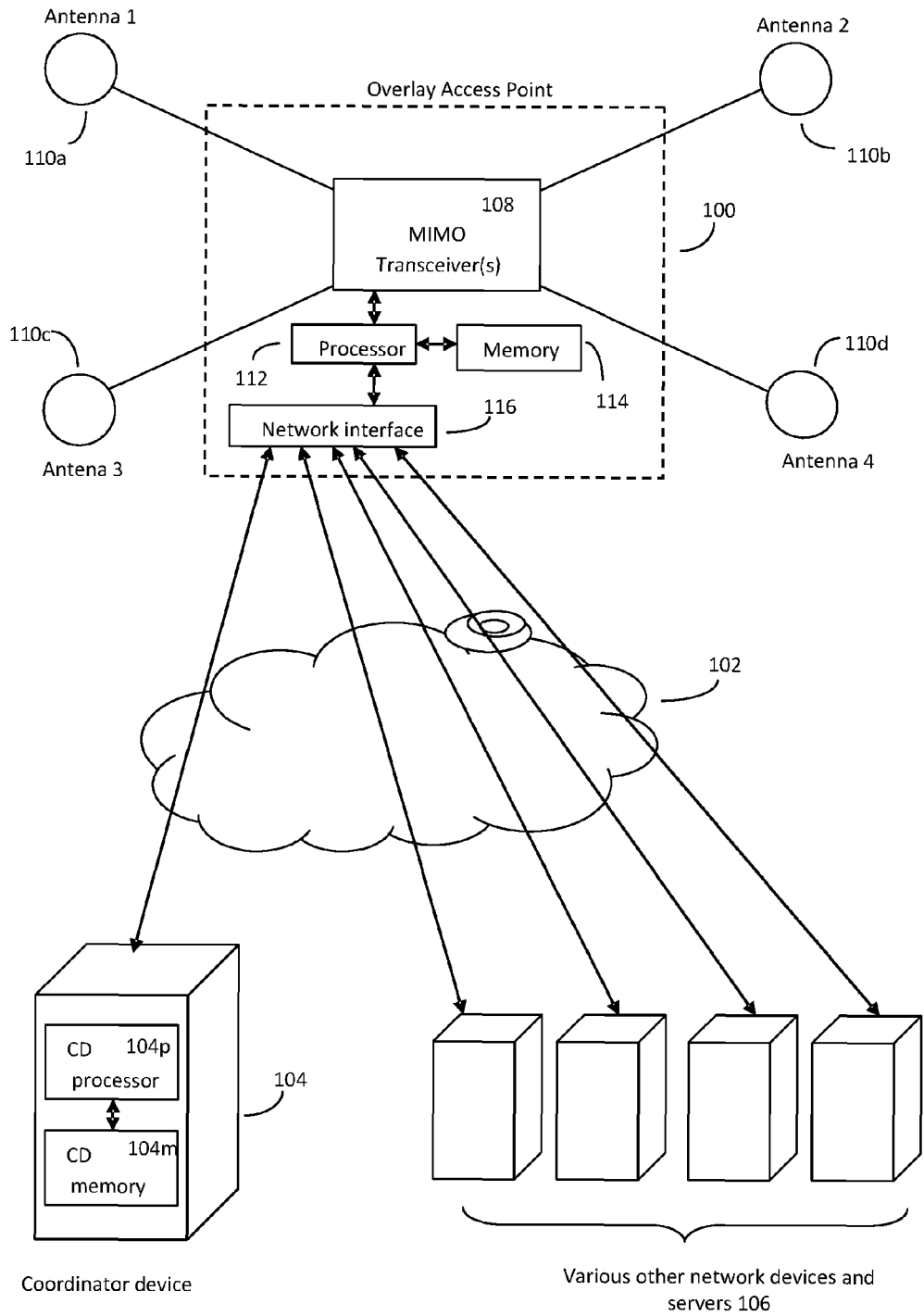
FIG. 1 illustrates a system including a MIMO-type wireless overlay access point (OAP) in network communication with one or more coordinator device (CD) servers and in wireless communication over unlicensed spectrum with various local wireless devices.

FIG. 1 illustrates a system including a MIMO-type wireless overlay access point (OAP) (100) in network communication with one or more coordinator devices (CD) (104) and in wireless communication over unlicensed spectrum with various local wireless devices. The OAP device also may provide these local wireless devices with connections to external networks. The OAP (100) can connect over various types of network connections, which need not be wireless connections (102) (e.g. may be optical fiber, cable, and the like), to networks (such as the Internet), and from there to the one or more CDs (104) as well as to other network devices such as other Internet servers (106).

The OAP (100) will usually comprise at least one unlicensed spectrum transceiver (108), which often may be multiple unlicensed spectrum transceivers (or antenna chains) configured for MIMO operation using multiple antennas (110a, 110b, 110c, 110d). This transceiver(s) (108) will usually be controlled by at least one processor (112) connected to memory (114), such as Flash or RAM memory. The memory 114 may store software program instructions, operational parameter data, and other types of data. The OAP (100) can use a network interface device (116) to connect to other networks (102) such as the Internet.

In some embodiments, the CD can be a remote server that is connected to the various OAPs by various methods, such as network (102). Note however that in some embodiments, the CD device can itself function as its own overlay access point while still operating as a remote CD device for other OAPs.

Figure 2:
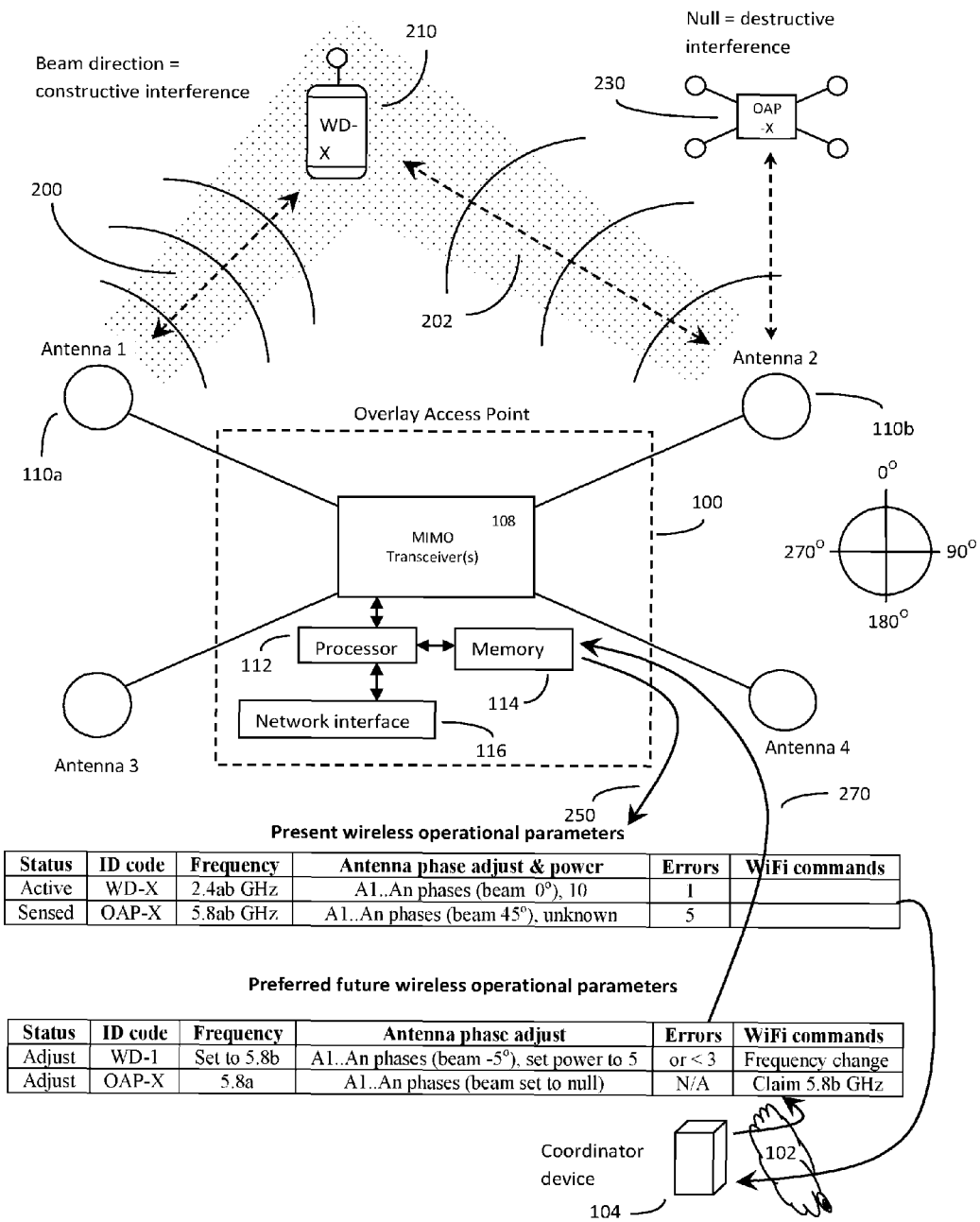
FIG. 2 illustratively represents one manner in which the MIMO-type OAP device of FIG. 1 may be configured to control the directionality of one or more of its wireless beams.

FIG. 2 illustratively represents one manner in which the MIMO-type OAP device of FIG. 1 may be configured to control the directionality of one or more of its wireless beams. Referring to FIG. 2, the processor (112) of OAP (100) may be configured to control the directionality of one or more wireless beams (200), (202) to and from various local wireless devices (WD) (210) and other local wireless overlay access points (OAP) (230). This wireless beam directionality can be controlled by, for example, varying the relative phase of the wireless waveforms (200) (202) emitted or detected by the OAP's various antennas, such as antennas (110a) and (110b).

In this example, the MIMO wireless overlay access point (OAP) (100) is also reporting (transmitting) various present wireless operational parameters (250) regarding this OAP device and other local wireless devices (WD) (210) to a remote coordinator device (CD) (104). This MIMO wireless overlay access point (OAP) is also configured to receive preferred future wireless operational parameters (270) (e.g. commands, suggestions, hints) from the coordinator device (CD) (104).

Thus each OAP (100) is a wireless network access point will generally be configured for operation on unlicensed radio spectrum. At least certain OAPs (100) may also be configured to automatically negotiate or configure present wireless channel access parameters with local wireless devices (e.g. 210) and other local overlay access points (e.g. 230). The OAPs (100) may also provide network (102) connectivity to at least the local wireless devices (210). In some embodiments, such connectivity may be established using various standards for negotiation between unlicensed spectrum devices, such as various WiFi or other types of standards.

Thus in some embodiments, there is provided a system and method of optimizing performance of a plurality of overlay access points (OAP) (100). As is shown in FIGS. 1 and 2, this system and method uses at least one coordinator device (104) to obtain present wireless operational parameters (such as 250) from various OAP (100). The coordinator device (CD) (104) will generally comprise at least one CD processor (104p) and CD memory (104m). The software running on processor (104p) of the at least one CD typically configures the CD to either frequently query the various OAPs for these present wireless operational parameters or to receive data packets including such parameters without querying the various OAPs. The CD will generally be further configured to utilize these present wireless operational parameters (250) in developing at least one model of the OAP's local wireless environment.

This model, usually stored in memory CD memory (104m), will typically comprise various types of data, such as the present relative or absolute positions of the various overlay access points (OAP) in a particular location, as well as the various present wireless communications modes presently being used by these various OAP. See, e.g., FIG. 3. The model may also be enhanced using various algorithms to form theories of where other wireless devices are, as well as various algorithms to form theories of where other wireless devices are likely to be moving, or theories as to likely near future modes of operation of the OAP or various wireless devices.

In some embodiments, these present wireless operational parameters can further comprise any of the OAP device's present received wireless channel parameters (e.g. based upon signals received by the OAP from other wireless devices in its vicinity), present transmitted wireless channel parameters (e.g. the wireless channels, frequencies, and wireless modes on which the OAP device is presently transmitting information), present transmitter power parameters (e.g. the power levels the OAP device is using to transmit its various wireless waveforms). Additional parameters, such as MIMO parameters, may also be considered.

Thus in some embodiments, the CD's model of the OAP's local wireless environment will include present wireless communications modes such as these present received wireless channel parameters, present transmitted wireless channel parameters, and present transmitter power parameters. As before, the CD device and model can then be used to adjust, create, or optimize the various theories of what might be a given OAP's preferred wireless operational state. Typically, these theories will seek to find operational modes the various OAP devices in a particular area (roughly between 2× to 10× the longest distance that the wireless signals will reach) can operate in a mode that reduces interference with at least one other local OAP (or LAP), while for example still maintaining connectivity with the other appropriate local wireless devices.

As is discussed herein, the disclosed system and method are directed in part to a CD that manages OAP and the interaction thereof with various wireless devices within a given area or location. In this regard the term "location" or "area" is not intended to be overly limiting, but is intended to express the fact that if various OAP or wireless devices are located very far apart (here somewhat arbitrarily set at about 2 to 10 times the longest distance that the particular unlicensed spectrum waveforms are expected to reach, or alternatively at a distance greater than the length that that wireless interference or cooperation between devices is significant or measurable), then the probability of interference or cooperation between such devices is minimal, and thus the CD can safely ignore very distantly located devices. In areas such as a city or urban area, a CD may keep track of many different locations or areas, and these areas may overlap to some extent.

Figure 3:
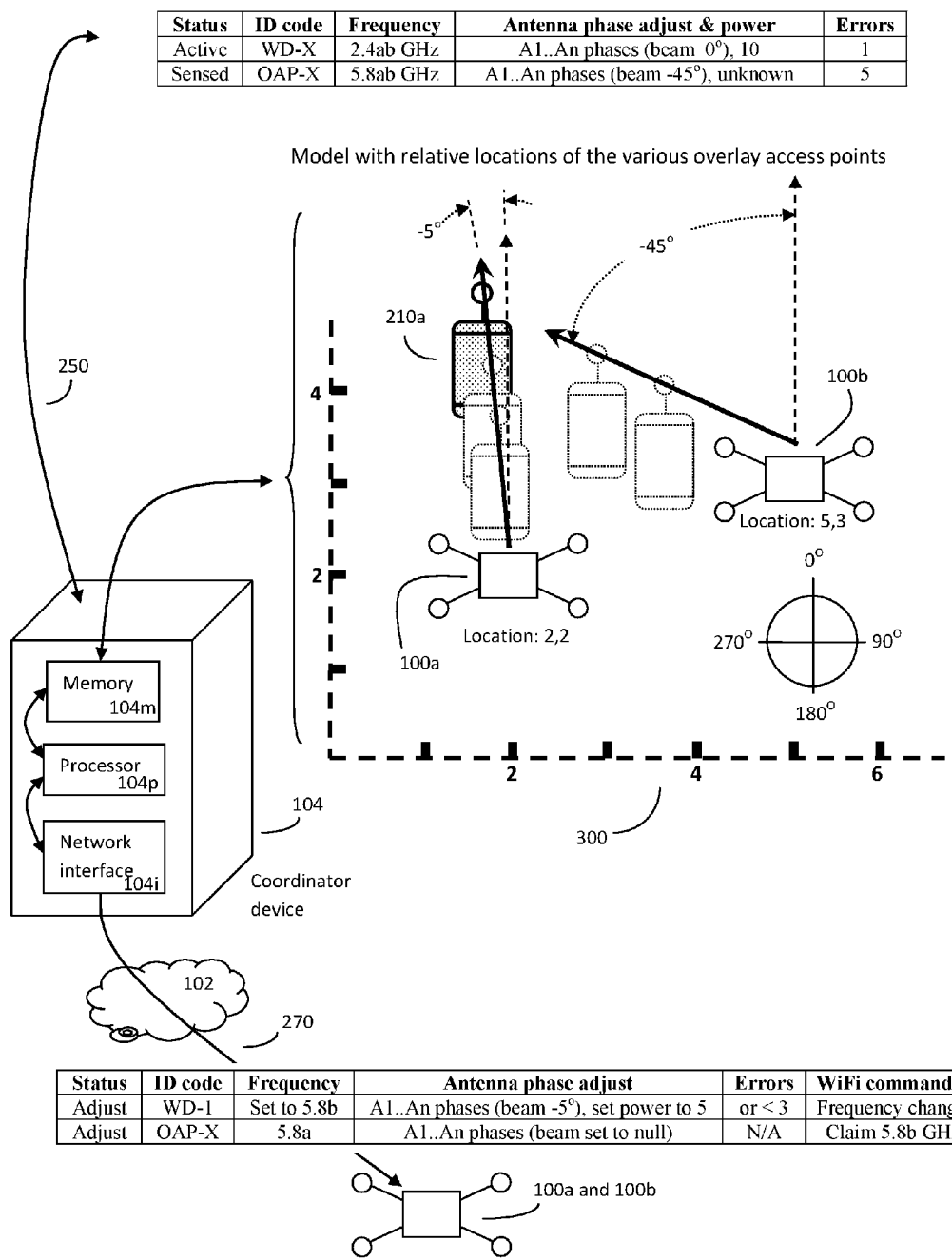
FIG. 3 depicts exemplary operation of a coordinator device (CD) in communication with one or more overlay access points in a system for coordinated wireless network management in accordance with the disclosure.

Attention is now directed to FIG. 3, which represents exemplary operation of a coordinator device (CD). The CD may be implemented using, for example, a server configured to be informed of at least the locations of at least some of the various overlay access points (OAPs) and the wireless operational parameters presently used by these overlay access points. From this data, the CD can construct a model of the local environments of the various overlay access points, and from this model can in turn use various rules to construct various theories of more efficient operation. For example, in the embodiment of FIG. 3 the CD processor is using triangulation of reported beam directions (obtained from two OAPs of known location) to determine the probable location of a wireless device (WD). The CD can then use this information, and various software algorithms or theories to in turn construct a theory of a more optimal preferred future wireless operational state of the various OAPs. The CD can then transmit various commands, suggestions, or hints regarding these theory optimized parameters to the various OAPs.

The CD may obtain information pertaining to the locations of the OAP and other devices in various ways. For example, when a user installs an OAP or LAP, the user may simply contact the CD server (perhaps using a web browser, or automatically) and enter the street address of the OAP or LAP into the CD server's memory. Alternatively the OAP device may have a GPS receiver, or work with GPS receivers on local devices (e.g. GPS equipped smartphones) so as to again obtain its location using GPS techniques. For example, an OAP or LAP server, as part of an activation sequence, may require that a user use a suitable smartphone app located proximate to the OAP or LAP device during activation, and the smartphone app can in turn transmit GPS locations to the OAP device and/or the CD device. Many other schemes to determine device location may also be used.

Referring again to FIG. 3, the locations of all of the OAPs reporting to the CD 100 can be stored in memory (104*m*) in order to create a rough model or map (300) of the relative locations of OAP (or LAP) devices in the local environment. This initial model may then be supplemented with additional data regarding the local wireless environment as additional reports of the present wireless operational parameters for these various overlay access points (OAP) are received at the CD.

In some embodiments, this model or map can be further supplemented with additional information, such as map data, topological data, and data regarding the distribution of interfering sources and various wireless obstructions and reflectors.

For example, the CD can combine information from the known location of the various OAP devices, and the various present wireless operational parameters for these various overlay access points (OAP), to form theories as to the distribution of the various other wireless devices in the map of the local OAP environment (300). For example, as shown in FIG. 3, the CD knows from the input of various present wireless operational parameters (from the various OAP) that there is a wireless device WD-X (210*a*) located (according to the OAP MIMO antenna phase data) at an angle of roughly 0° relative to OAP device 100*a* at location (2,2). The CD also knows that the signal strength is strong (power 10) and there is a low error rate (1). This suggests that WD-X (210*a*) is relatively close to OAP device 100*a*, at an angle of roughly 0o.

The CD also knows, from the present wireless operational parameters received from the other OAP device (110*b*) at location (5, 3), that the other OAP device (110*b*) detects the same WD-X device (210*a*) at an angle of about −45o from the other OAP (110*b*). The lower signal intensity and higher error rate suggest that WD-X is located further away from OAP (110*b*). In this simple example, the CD device (104) can form a theory that if WD-X device (210*a*) is located at coordinate (2, 4), then this would be consistent with both sets of data from both OAP devices.

The CD can also observe from the data that WD-X, although presumably close to OAP (100*a*) is transmitting using the scarce (i.e. often congested) but relatively long range 2.4 GHz frequencies on channels "a" and "b".

Here, CD may be programmed or configured with various algorithms or theories intended to enhance overall operational efficiency. One of these can be a rule such as "don't waste long range 2.4 GHz frequencies on close-by wireless devices if it is feasible to use shorter range 5.8 GHz frequencies". The reason for this rule will be made more explicit shortly.

Thus from these various types of data, the CD can construct an increasingly detailed model of the local environments of the various overlay access points (OAP), and from this model in turn construct various theories as shown in (300). The CD (104) can then use this information and various theories to in turn construct a theory regarding more optimal preferred future wireless operational states of the various overlay access points (OAP). The CD can then transmit these theory optimized parameters in the form of various commands, suggestions, or hints to the various overlay access points (OAP).

For example, as a result of the previously discussed analysis, in FIG. 3, the CD is now instructing OAP device (100*a*) to shift frequency from the longer range 2.4ab GHz channels to a shorter range (but possibly higher bandwidth) 5.8 GHz "b" channel (5.8b GHz).

The CD is also instructing OAP device (100*b*) that OAP device (100*a*) wishes to claim the 5.8a GHz channel (this will be described shortly) and that OAP device (100*b*) should preferably operate at the 5.8b GHz channel frequency range. The value of being able to control the OAP in this manner will become even more apparent when we consider more complex examples, as will be discussed shortly in FIGS. 4-7. Note that although conventional Wi-Fi communication allows for one device to claim another channel ahead of another (using CCA and/or broad channel intolerance bits), this sort of "I'll take 5.8a GHz, you take 5.8b GHz to free up 2.4ab GHz for you and other access points to use" strategy is not believed to be conventionally used.

The coordinator devices (CDs) (104) may thus be further configured to use models such as (300) to create at least one theory of at least one preferred future wireless operational state of one or more overlay access points (OAP) (100). These CD's can then use this at least one theory to provide future wireless operational parameters the various OAP (100) in the form of various commands, suggestions, or hints.

As previously discussed, at least some of these various present or future wireless channel access parameters vary according to the overlay access point's local environment, in particular according to the various types of wireless signals in the local environment. In general, the system is designed so that upon receiving these various future wireless operational parameters, the various OAP will use these future wireless operational parameters to increase a probability of that they will operate according to the theory, with the goal of providing improved wireless network connectivity to the various wireless devices in the vicinity of the various OAP.

As previously discussed, conventional access points are configured to set their wireless parameters autonomously; that is, by direct negotiation with other local wireless devices, without use of any higher order direction from coordinator devices. This approach may have certain advantages in some situations. For example, it allows local wireless devices to make very rapid configuration changes in response to changes in the wireless environment. An additional advantage is that, using WiFi as an example, there is an installed base of hundreds of millions of prior art WiFi access points and wireless devices. Thus in some embodiments, at least some backward compatibility with prior art unlicensed spectrum standards, or other autonomous methods, is highly desirable.

Thus in embodiments where the system disclosed herein is intended to operate using legacy unlicensed spectrum protocols, such as WiFi protocols, it will be helpful if the various OAP used herein are configured with an ability to co-exist with legacy access points, such as WiFi access points, that are not responsive to commands from a coordinator device.

Additionally, when the OAP devices used herein are intended to operate with newer wireless protocols, such as OTFS wireless protocols, because remote CD servers may not be able to respond as quickly to changing wireless situations, it may also be useful to configure the OAP devices to be capable of at least some degree of being able to autonomously negotiate various wireless parameters with other local wireless devices. Thus in some situations, these devices may need to treat input from the CD as suggestions or hints, rather than absolute commands to obey regardless of other considerations.

It may also be desirable, in some situations, for the CD to be able to completely override any previous OAP wireless configurations, and issue commands that the OAP device must obey.

Thus in some embodiments the OAP devices and optionally the CD devices as well may be configured to co-exist with autonomous or legacy access points (here both autonomous and legacy access points are occasionally termed "LAP", to distinguish them from the invention's overlay access point teaching or "OAP"). One way to do this is to configure the OAP to be capable of operating autonomously (and if legacy compatibility is desired, according to appropriate legacy protocols) in the absence of any input from the CD. Then, depending upon circumstances, input from the CD can be implemented as "hints", "biases", or "suggestions" that cause the OAP to weigh two options: 1, the wireless configuration that the OAP would configure if operating only by following autonomous or legacy standards; and 2) the wireless configuration suggested by the CD device; and adopt a wireless configuration mode that is to some extent compatible with both options.

In some embodiments, these OAP access points may function according to prior art access points such as WiFi access points, in which case the OAP access point may be compliant with some or all of the various IEEE 802.11 standards. In other embodiments the OAP access points, although configured to function autonomously as well as under CD control, need not comply with any existing standards. For example, it may be useful to create OAP access points that operate according to OTFS wireless waveforms, yet may also be configured to employ one or more autonomous strategies (some of which may follow the WiFi examples discussed herein) to operate adequately in the absence of CD commands or hints.

Discussion of Orthogonal Time Frequency Space (OTFS) wireless communications methods can be found in, for example, U.S. patent application Ser. Nos. 13/927,091; 13/927,086; 13/927,095; 13/927,089; 13/927,092; 13/927,087; 13/927,088; 13/927,091; 14/583,911, 15/152,464, and U.S. Pat. No. 9,071,285, the entire contents of each of which are incorporated herein by reference in their entirety.

The disclosed embodiments may leverage the fact that prior art legacy or autonomous methods of unlicensed wireless spectrum access point configuration generally rely on techniques where the LAP records information pertaining to various wireless characteristics of its local environment, and then adjusts its operation accordingly. These methods include the previously discussed techniques such as listening for beacon frames from other local access points, clear channel assessment tests, presence of broad channel intolerance bits in data frames received from other local wireless devices, error rates of data packet transmission according to various wireless communication modes, and feedback matrices from other devices that report back as to what particular beam directions are best for communicating with that particular other device.

To allow a CD device to "gently guide" an OAP towards a more favorable mode of wireless operation (i.e. issue suggestions or hints, rather than outright commands), while still maintaining compatibility with legacy or autonomous operation, instructions from the CD need not always completely override the OAP wireless settings. Instead, instructions from the CD device can be used alongside with the information pertaining to various characteristics of the OAP local environment.

CD instructions to the OAP (as suggestions or "hints") for example, may be used to either simulate or mask or alter, at the OAP level, beacon frames from the OAP access point or other local access points. CD "hints" may also be used to change the thresholds used by the OAP for various clear channel assessment tests. CD "hints" may also be used to simulate or mask the presence of broad channel intolerance bits in data frames received from other local wireless devices. CD "hints" also may be used to increase or decrease the OAP's perception of error rates of data packet transmission according to various wireless communication modes. CD "hints" may also be used to mask or induce bias in the feedback matrices from other devices that report back as to what particular MIMO beam directions are best for communicating with that particular other device. By biasing feedback matrix data, for example, the CD "hints" can be used to shift the beam direction used by a MIMO OAP device, at least to some extent.

To generalize, at least some of these "hints" may be future wireless operational "hints" that are intended to create a bias in various random or semi-randomly varying wireless channel access parameters by various methods. Note that "random or semi-randomly varying wireless channel access parameters" does not mean that the various parameters (error rates, signal strength, MIMO direction) and the like are varying in a completely random manner, but rather that there is at least some underlying random or semi-random noise or fluctuations in these parameters. This underling noise level can be exploited by using the CD instructions to create a stronger or weaker bias in these noise levels to gently walk the configuration of the OAP towards the CD's desired goal. Put alternatively, depending on the strength of the bias that the CD transmits, the CD can dial its instructions from various levels ranging from an outright command to a subtle hint.

These methods can include any combination of increasing or decreasing the perceived noise or error rates associated with wireless transmission or reception of signals by these hint-receptive overlay access points. For example a CD that desires a OAP device to gradually stop using a particular wireless mode of operation could send commands that make this mode less favored by making the OAP device "think" that the mode is causing more errors or has a weaker signal than is actually the case. Conversely a CD that desires a OAP device to start favoring a particular mode of operation could send commands that make this mode more favored by making the OAP device think that the mode is causing fewer errors or producing a stronger signal than is actually the case.

At one extreme, if the magnitude of the changes caused by the CD commands or "hints" is relatively mild, then the OAP device will remain highly compatible with any local autonomous or legacy LAP devices, as well as highly responsive to changes in local wireless conditions. The CD's model can keep track of the number of known or suspected LAP devices in the vicinity of any OAP, and adjust the magnitude or weighting of its OAP hints accordingly. For example, a CD device might send lower weighted "hints" to an OAP surrounded by large numbers of LAP. Conversely, a CD device might send higher weighted hints, or even outright commands, to OAP in areas where there are few if any other LAP.

Thus in some embodiments, the OAPs may be hint-receptive overlay access points (hint-receptive OAP), configured for operation on the unlicensed radio spectrum without need for a CD's future wireless operational parameters. These hint-receptive OAPs can be further configured (again typically by software) to negotiate or configure their present wireless channel access parameters with any of the local wireless devices, local wireless legacy access points, and other local hint receptive overlay access points. Here at least some of these present wireless channel access parameters can be random or semi-random wireless channel access parameters that vary either randomly or semi-randomly according to the hint-receptive OAPs' local (wireless) environment. Here the hint-receptive OAP is also configured to receive future wireless operational parameters from the CD, but here the hint-receptive OAP receives these parameters as future wireless operational "hints". These hint receptive OAP can then use these future wireless operational "hints" to create a bias in the various random or semi-random wireless channel access parameters. The net result of this bias is to increase a probability that the hint-receptive OAP will operating according the CD's theory what is best for the situation, but at the same time the hint-receptive OAP can still perform, to a greater or lesser extent, in an autonomous or legacy mode and in some cases still make rapid changes in operation as warranted by the local situation.

To improve performance, ideally the CD's model or models of the local (wireless) environment of the various OAPs will also be configured to model the relative locations of various LAP devices as well, even though these LAP devices will not be capable of communicating directly with the CD, nor respond to any commands or "hints" from the CD.

To obtain information about any local LAP for the CD model, the various OAP can be used to test their local environment for any wireless signals emitted by any local LAP devices, and send this information to the CD device. The CD device can then attempt to infer the probable locations and at least some of the wireless parameters used by these various LAP devices. The CD device can further take the properties of these various LAP into account when it creates theories of how best to operate the OAP, and when it sends commands (hints) to the various OAP.

Put alternatively, in some embodiments, the CD's at least one model of the OAP's local wireless environment can be a LAP-aware model that is configured to be further capable of also modeling relative locations of at least one LAP which (by definition) is not under CD device control. To do this the CD will obtain present wireless operational parameters from the various OAP devices, and these wireless operational parameters will typically have or comprise information pertaining to signals obtained from at least one LAP detected by the OAP. Based on this, the CD can then use the present wireless operational parameters (which contain information about the LAP location and present wireless activity) to deduce the probable locations and present wireless communications modes used by the various LAP. The CD can then update it's (now legacy device aware) model to keep track of the various LAP. The CD can also use its (now legacy device aware) model to create at least one theory of at least one preferred future wireless operational state of at least one OAP. From this theory, appropriate instructions, ranging from commands to "hints" can then be sent to the various OAP.

The methods described herein are particularly useful for MIMO beam focusing methods. Thus in some embodiments, at least some of the various OAP may be MIMO OAP, where each MIMO OAP comprises a plurality of antennas (e.g. FIG. 2, antennas 110a, 110b, 110c, 110d) configured to produce at least one adjustable beam direction (e.g. FIG. 2 200 or 202) in response to MIMO configuration parameters.

Consider the case where the OAP detects a wireless device, such as a newly detected wireless device. When the MIMO OAP transmits wireless operational parameters to the CD, the wireless operational parameters can include both the new wireless device detection parameters, and the new wireless device MIMO direction parameters.

This new wireless device MIMO direction is relative to the location of that particular reporting OAP, and the real direction can be determined or at least estimated based on the MIMO antenna phase parameters, such as the MIMO OAP device steering parameters and/or the new device MIMO antenna feedback matrix. Thus the system can use this information, along with the CD and its corresponding model, to estimate or determine the probable locations of a newly appearing wireless device. The CD can also use this model and these various probable locations to adjust the CD devices theory(s) of what is the best (preferred) wireless operational state(s) of the various local OAP.

Note that much of the discussion here can apply to both MIMO and non-MIMO OAP, as well as to autonomous or legacy capable MIMO and/or non-MIMO OAP. In general to keep unnecessary verbiage to a minimum, just the term "OAP" will be used in this discussion. Of course when the discussion speaks specifically of using MIMO techniques, the OAP will typically be a MIMO OAP. When the discussion speaks specifically of using autonomous or legacy capable OAP, then the OAP will typically be an autonomous or legacy capable OAP with or without MIMO capability, as per the context of that part of the discussion.

Figure 4:
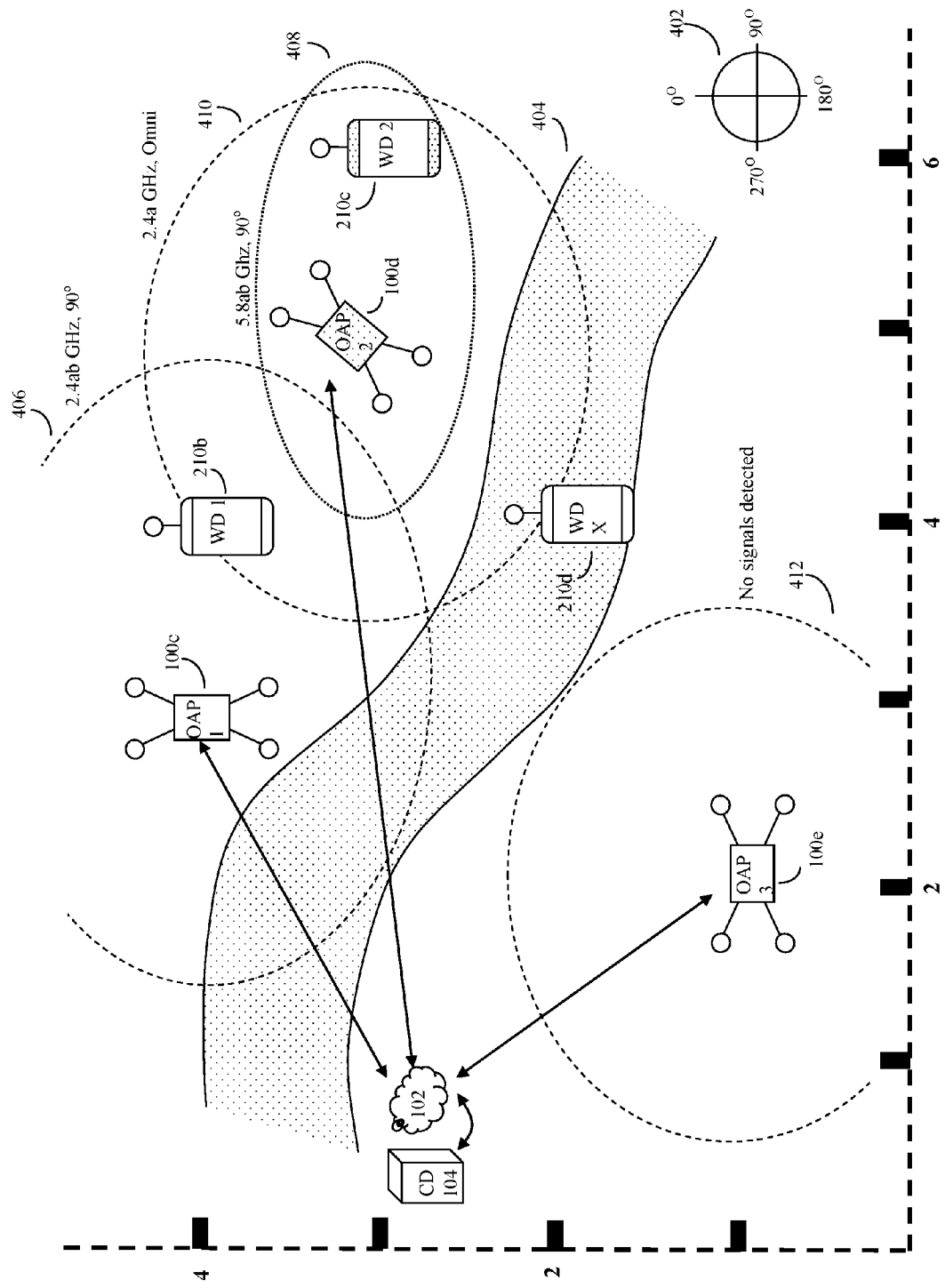
FIG. 4 shows an example of a local environment including three MIMO overlay access points and three different wireless devices (WD) configured for negotiating rights for communication channel usage.
Figure 7:
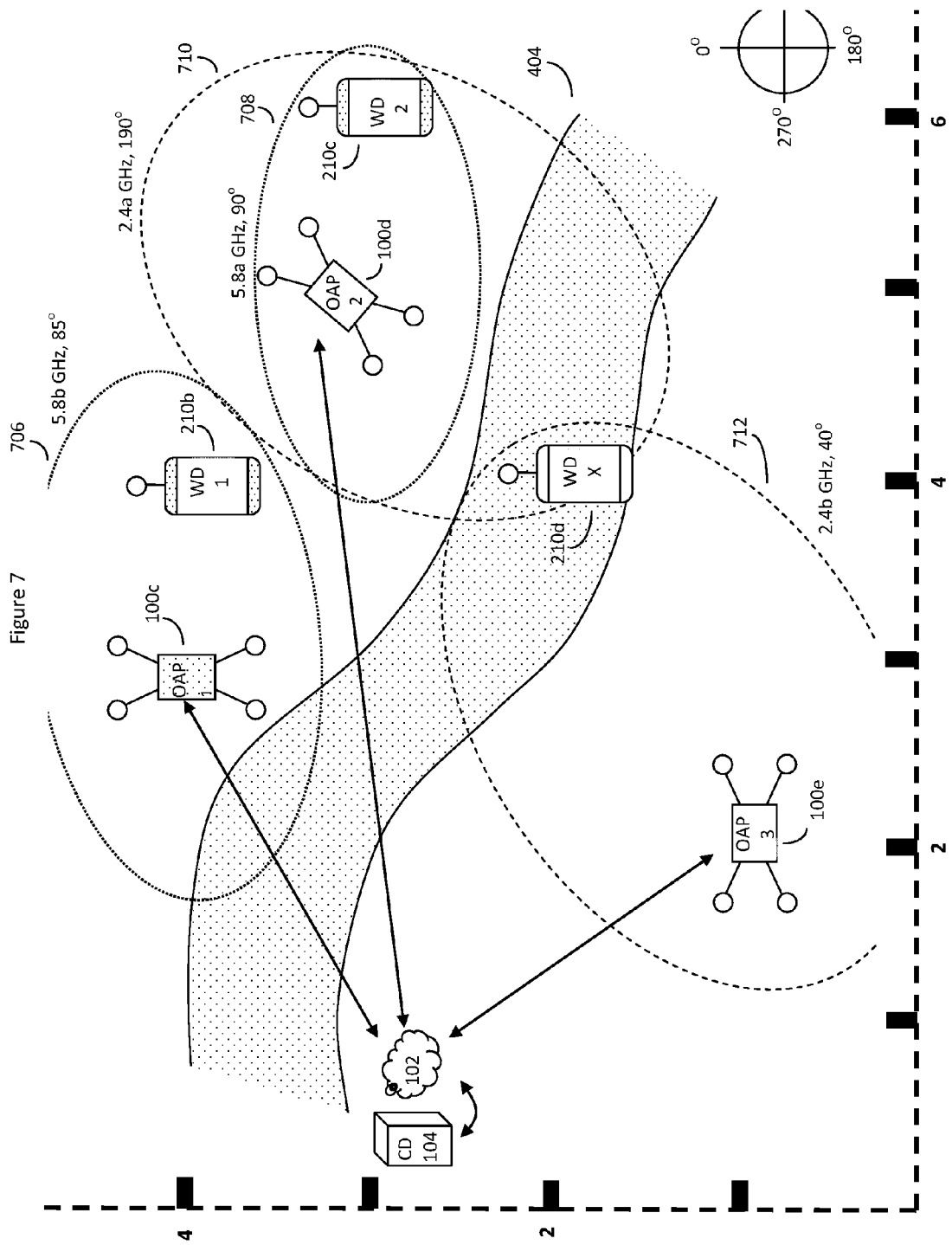
FIG. 7 shows an example of a local environment where three MIMO overlay access points (OAP) and three different wireless devices (WD) operate in an improved manner in accordance with the disclosure.

As can be seen in FIG. 3, as well as FIGS. 4 and 7, one substantial advantage of the modeling approach disclosed herein is that the CD can now keep track of the relative locations of the various OAP (and LAP) and wireless devices around a local region of interest (e.g. various OAP in a neighborhood) and use this location information to help optimize the direction of various MIMO wireless beams emitted by the various OAP. This can both create better wireless network connectivity to appropriate wireless devices, and also reduce interference with other OAP, LAP, and inappropriate (non-targeted) wireless devices.

Put alternatively, in some embodiments, the CD may determine that the preferred operational state of one or more OAP. This preferred operational state may be an operational state in which the OAP device's one or more adjustable wireless beam direction is shifted from its present beam direction. As previously discussed, this may be true even if the OAP is a legacy compatible OAP that is using conventional MIMO techniques to try to optimize beam direction. Because conventional techniques fail to consider the overall system, the CD, which has more information because its model is seeing the local "big picture" may determine that further adjustment may produce a more global optimization of overall system performance.

The techniques disclosed herein can be very useful in certain situations where, for example, a wireless device is a poorly served wireless device that may be beyond the nominal or at least optimal range of any one given unlicensed wireless spectrum access point. If at least some of the access points are OAP devices, then the CD can model the probable location of the poorly served wireless device, and form a theory of operation in which the poorly served wireless device might be given better network connectivity by coordinating the operations of two or more OAP devices in the vicinity of the poorly served wireless device.

This can be done by several methods. One method is to have the CD direct the relevant OAP devices near the poorly served wireless device to switch to communicating with the poorly served device using lower frequencies (such as 2.4 GHz), which tend to travel significantly farther (roughly twice as far) than higher frequencies such as 5.8 GHz. The CD can also direct the OAP devices to be more tolerant of noisy signals (i.e. not sever connections, but attempt to remain connected to a more distant poorly served wireless device) by lowering the perceived noise levels or signal intensity thresholds.

The CD can also direct relevant MIMO OAP devices to each adjust their beam direction, and vary other wireless parameters (such as SSID identification), so that multiple OAP can provide focused beams designed to both provide network connectivity with the poorly served wireless device. Further techniques, such as directing various OAP devices to coordinate with other relevant OAP devices in carrying data to and from the poorly served wireless device and the network, such as by forming spontaneous or temporary extended service sets, or other methods, can also be done.

For example, there may be situations where the system shifts at least one MIMO adjustable OAP wireless beam direction from a present beam direction to an alternative beam direction for purposes of either reducing interference with another access point (either OAP or LAP), or alternatively for the purpose of improving signal strength to (and from) at least one other local wireless device.

As another example, shown in more detail in FIGS. 4-7, there may be situations where the preferred operational state of the various local OAP may be an operational state in which at least one adjustable beam direction from a first OAP, and at least one adjustable beam direction from a second OAP, are both shifted so as to intersect with a probable location of a (poorly served) local wireless device. Here, the various future wireless operational parameters can further be used to configure both OAP (and all participating) devices to work together to provide network connectivity to this (formerly) poorly served local wireless device.

FIG. 4 shows an example of a local environment including three MIMO overlay access point (OAP) devices (100c, 100d, 100e) and three different wireless devices (WD) (210b, 210c, 210d) configured for negotiating rights for communication channel usage. In the embodiment of FIG. 4 each of the MIMO overlay access points devices (OAP) report their various wireless operational parameters to the remote coordinator device (CD) (104) by way of a network such as, for example, the Internet 102.

Thus a CD device (104), knowing the locations of OAP devices (100c, 100d, and 100e), and receiving present wireless operational parameters from all of these OAP (shown in FIG. 5), may create a model of the local wireless environment of these three OAP that, if expressed in visual terms, could be of the type depicted in FIG. 4.

Referring to FIG. 4, the X (horizontal) and Y (vertical) axis of this model show distance (here in arbitrary distance units, such as units of perhaps 50 feet per unit). The relative angles in this model (useful for understanding the MIMO beam direction discussion) are shown as (402). In this figure, assume that the three OAP are each configured as legacy (e.g. Wi-Fi) compatible OAP, and that each OAP is deployed in a separate building or residence, perhaps in a suburban neighborhood. There is a road (404) running through the neighborhood, and wireless device (WD-X) (210d), perhaps part of a smartphone that is being carried by a pedestrian walking down road (404), is at present poorly served by any of the OAP, but is at least detectable by OAP-2 (100d) at the extreme wireless range of OAP-2 (100d) (410).

The CD model of this area may or may not incorporate standard mapping data such as the location of the houses and road. However in some embodiments, it may be desirable to supplement the model with such map data, as this will allow the CD model and theory of operation to take local topology into account. Here the houses are not shown, but the road (obtained by mapping data from a source such as Google maps) is shown, since poorly served wireless devices may often travel down this road.

Note that when viewed from the perspective of the CD model, some problems (i.e. operational inefficiencies) are evident. OAP-1 (100c) is communicating with its local (and relatively nearby) wireless device WD-1 (210b) using both the "a" and "b" channels 2.4ab of the relatively long range 2.4 GHz Wi-Fi frequencies (406). Another problem is that due to the geometry of this case, the 2.4 GHz beam (406) is being sent out at a beam angle of 90° that is also being picked up (and is somewhat interfering with) OAP-2 (100d) on the 2.4 "a" and "b" channels. This makes it more difficult for OAP-2 (100d) to detect poorly served wireless device WD-X (210d).

OAP-2 (100d) is communicating with its nearby wireless device WD-2 (210c) using two channels 5.8ab of a more appropriate short range 5.8 GHz Wi-Fi frequency, and the direction of the OAP-2 beam to WD-2 is a more appropriate 90° (408). OAP-2 can also pick up, at the extreme end of its long range 2.4 GHz frequencies, on 2.4 GHz channel a (2.4a GHz), in omni-directional mode (410), poorly served wireless device (WD-X) (210d). However as discussed above, interference from OAP-1 (100c) on the 2.4ab GHz channel is further hindering service.

At present, OAP-3 (100e) isn't communicating with anything. That is, no wireless devices are within range of OAP-3. WD-X (210d) is just a bit too far away, somewhat below the thresholds that OAP-3 is using to determine that a wireless device is active on a given channel.

Figure 5:
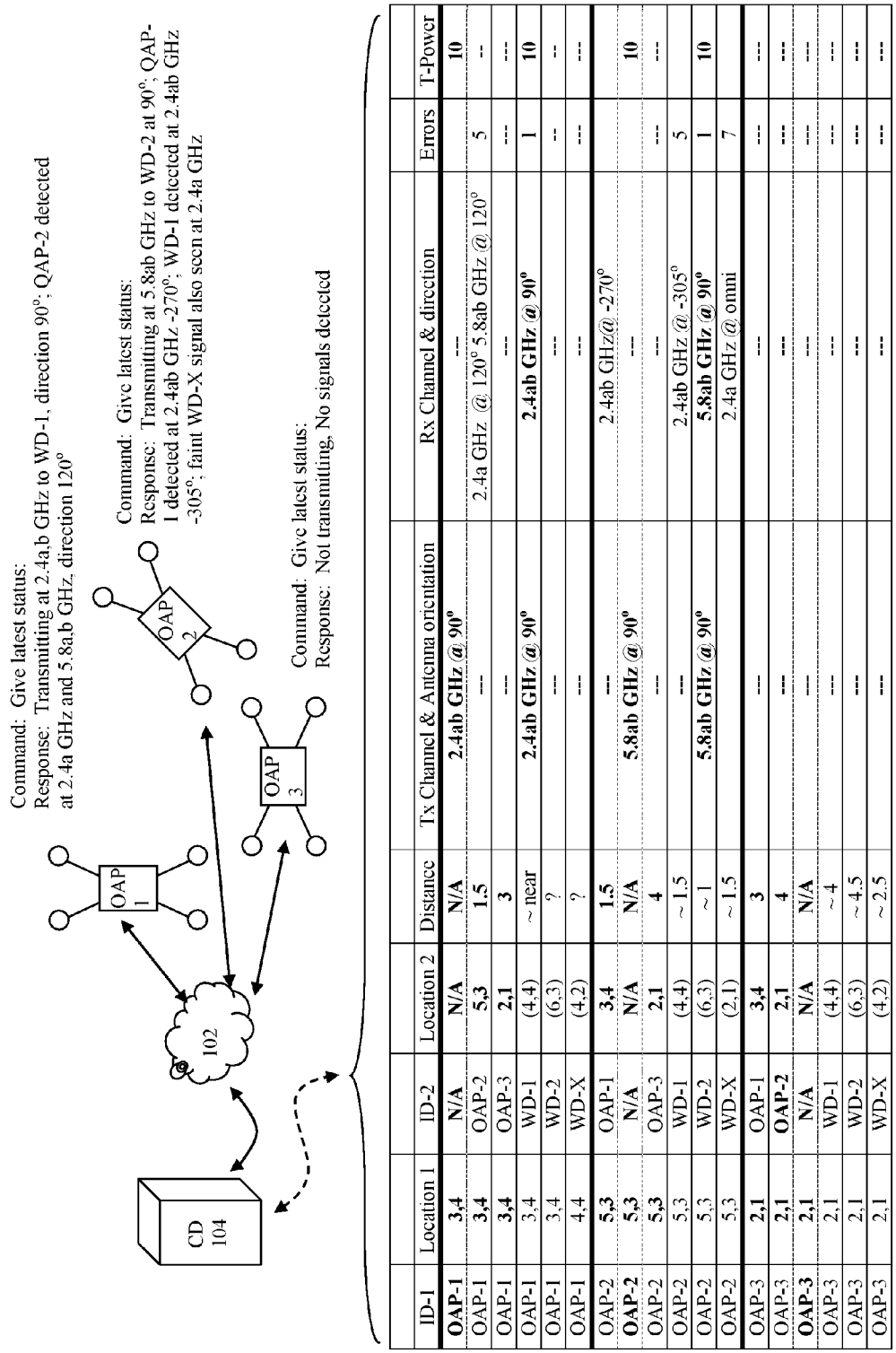
FIG. 5 illustrates a system in which overlay access points report their present wireless operational parameters to a coordinator device (CD) configured to develop models of the local wireless environment.

FIG. 5 illustrates a system in which overlay access points (OAP) devices report their present wireless operational parameters to a coordinator device (CD) configured to develop models of the local wireless environment. As is indicated by FIG. 5, the memory of the coordinator device (CD) can store and organize this data, along with information on the locations of the various overlay access points (OAP), in order to facilitate development or improvement of models of the local wireless environment, as previously shown in FIG. 4.

Figure 6:
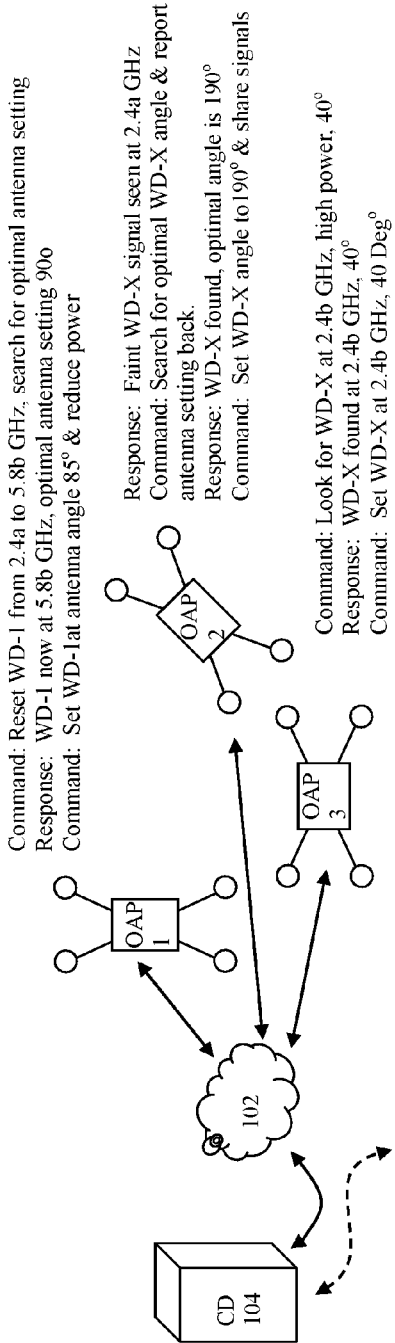
FIG. 6 depicts a coordinator device (CD) configured to develop optimal spectrum usage models and communicate preferred future wireless operational parameters to overlay access points so as to influence their operation consistent with the spectrum usage models.

FIG. 6 depicts a coordinator device (CD) configured to develop optimal spectrum usage models and communicate preferred future wireless operational parameters to overlay access points so as to influence their operation consistent with the spectrum usage models. In this embodiment the coordinator device (CD) may model and develop various theories concerning, for example, the relative position of other wireless devices (WD) and the optimal manner to use available wireless spectrum and MIMO OAP antenna configurations to improve connectivity and decrease interference. These theories or models may then in turn be leveraged to specify various preferred future wireless operational parameters selected to, for example, optimize the use of available spectrum (e.g., improve coverage uniformity or, alternatively, coverage and/or data rates for selected devices associated with higher levels of quality of service). The coordinator device (CD) can then transmit these various preferred future wireless operational parameters to the various OAP devices to reconfigure OAP device operation.

FIG. 7 shows an example of a local environment where the three MIMO overlay access points (OAP) and three different wireless devices (WD) now operate in a more optimal manner. In particular, wireless device WD-X, which was previously not being provided with adequate wireless coverage, is now connected to two different overlay access points, OAP-2 and OAP-3. These two access points may coordinate the work of communicating with WD-X using suitable longer range/lower frequency 2.4 GHz waveforms and better directed MIMO shaped wireless waveform beams.

Accordingly, various preferred future wireless operational states of these three OAP devices in this particular location may exist based on the model shown in FIG. 4. For example, in one case the CD might be programmed with rules requiring that, whenever possible, MIMO beam angles be adjusted to both continue providing acceptable coverage of a wireless device in communication with a given OAP device while also minimizing interference with other OAP devices or other non-target wireless devices. The CD may thus suggest that the OAP alter the angle of beam (406) to avoid interference with the OAP-2 (100d) device. Here only a few degrees of adjustment might be sufficient. Such an adjustment would correspond to beam (706) on FIG. 7 with the corresponding instructions (commands or hints) resulting in the CD making these adjustments being in FIG. 6.

The CD might also be programmed with other rules, such as to try to configure any given OAP device to conserve longer distance lower wavelength spectrum, so that this spectrum is available for nearby OAP devices that need to communicate over longer distances to their poorly served wireless devices. This would also correspond to beam (706) on FIG. 7, and the commands or hints to make this adjustment are also shown in FIG. 6.

The CD might detect that wireless device WD-X (210d), although detected by OAP-2 (100d), is at presently poorly served because it is at the extreme edge of OAP-2's 2.4a GHz long range Wi-Fi signal (410). The CD can see, for example, that the signal intensity is low, and that the error rate is relatively high. At the same time, the CD will know from the model that the OAP-3 device (100e), although not presently detecting wireless device WD-X (210d), is potentially close enough to WD-X (presumed to be located somewhere on the road 404) so that with proper configuration, OAP-3 might be in range of WD-X. If so, then both OAP-2 and OAP-3 could act together to provide better coverage to poorly served wireless device WD-X (210d).

The models developed by the CD may also suggest that the OAP-1 device (100c) be instructed or requested to cease using the 2.4ab GHz wavelengths to communicate with nearby wireless device (WD-1) (210b) and to instead shift to a more appropriate (shorter range) 5.8 GHz signal on channel b) 5.8b GHz. This results in beam (706) in FIG. 7, with the corresponding commands resulting in this change being shown in FIG. 6.

The CD could then also instruct the OAP-2 device to orient its 2.4a GHz beam at an angle of 190° to better cover WD-X using the longer range 2.4 GHz channel "a" frequency. The CD could then also instruct the OAP-3 device to search for WD-X at the longer range 2.4 GHz channel b frequency at a MIMO angle of 40°. The CD might also assist the two OAP (OAP-2 and OAP-3) to cooperate in communicating with the WD-X (210d) device.

The OAP within a given area can cooperate using various methods. One exemplary method of cooperation involves having both OAPs send and receive redundant signals on the 2.4a and 2.4b GHz channels. If noise corrupts some of the data packets, one or more redundant data packets are available to maintain data transmission rates. See the beams (710) and (712) in FIG. 7 and the corresponding commands in FIG. 6.

As another method of cooperating, OAP-2 and OAP-3 may transmit the same data twice (for example by using Space Time Block Code methods—STBC) or other methods, so that if the WD-X receiver fails to receive a given data packet from one OAP, it can recover by receiving the same data packet from the other OAP. Other schemes, such as HT duplicate mode type schemes, where two 20 MHz halves of a broader channel (such as a 40 MHz channel) each has an identical data stream, and the like may also be used.

In some embodiments, OAP-2 and OAP-3 may cooperate on at least a temporary basis to form an extended service set (ESS) with a shared SSID. In this manner, various OAP (here OAP-2 and OAP-3) can be configured with a capability of at least temporarily forming logically integrated networks that are made available to devices such as the WD-X (210d) device. For that matter, under some conditions, this extended service set might be a permanent service set. For example, residents of a neighborhood or other cooperative group might voluntarily set their OAP units for such service sets on a longer term basis.

Figure 8:
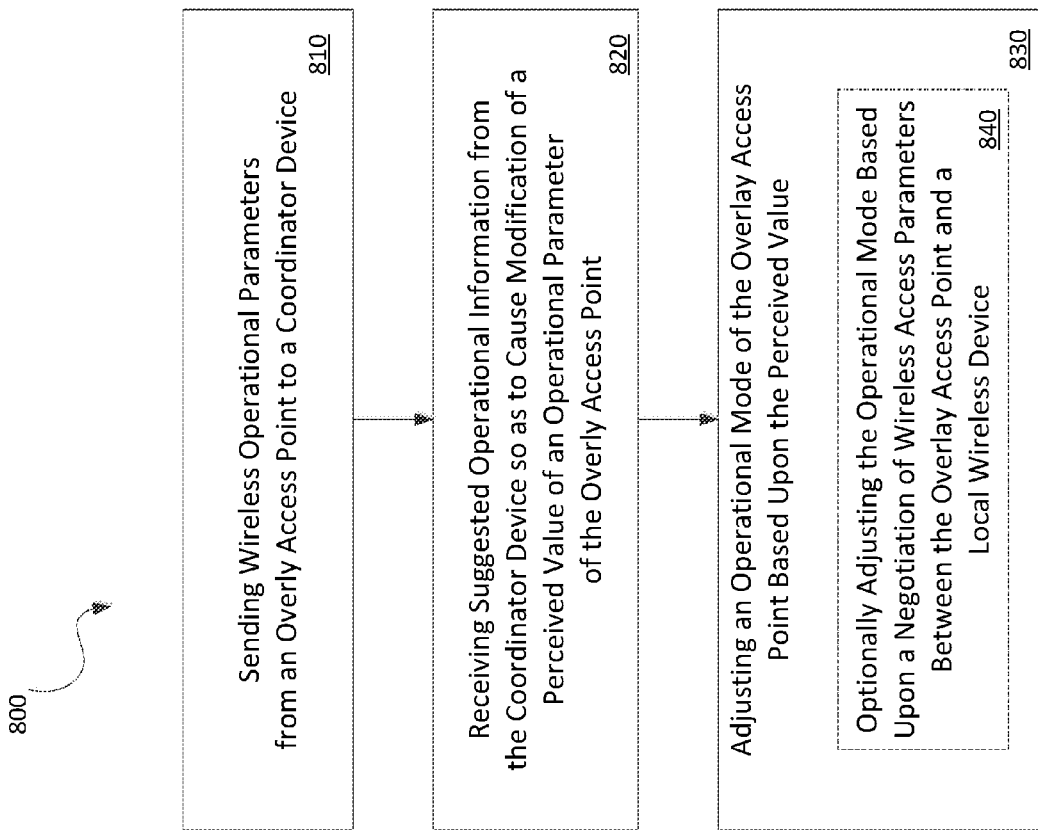
FIG. 8 is a flowchart illustrating exemplary operation of an overlay access point in facilitating a method for coordinated wireless network management in accordance with the disclosure.

Attention is now directed to FIG. 8, which is a flowchart illustrating exemplary operation of an overlay access point in facilitating a method for coordinated wireless network management 800 in accordance with the disclosure. The method includes sending, from one of a plurality of overlay access points to a coordinator device, wireless operational parameters characterizing operation of one of the plurality of overlay access points (stage 810). The method further includes receiving, at the overlay access point, suggested operational information provided by the coordinator device wherein the suggested operational information causes modification of a perceived value of an operational parameter of the overlay access point that is different from an actual value of the operational parameter (stage 820). An operational mode of the one of the plurality of overlay access points is then adjusted based upon the perceived value (stage 830). This adjustment may also be based in part upon a negotiation of wireless access parameters between the one of the access point and one or more local wireless devices (stage 840).

Figure 9:
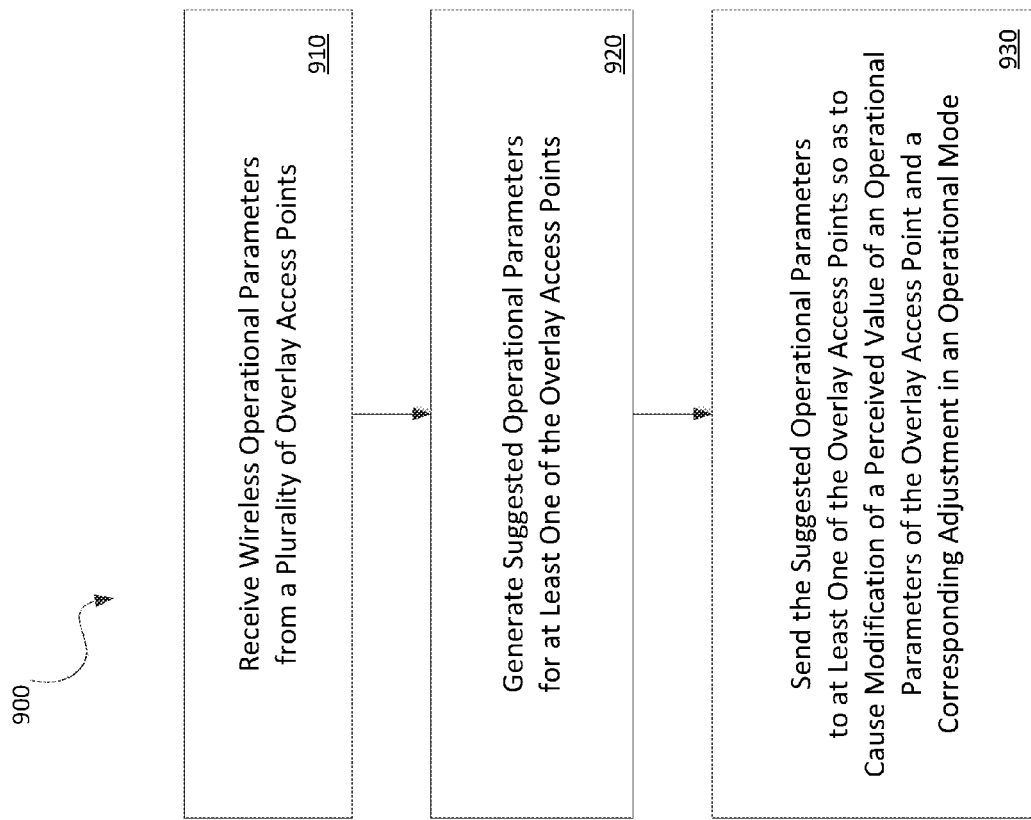
FIG. 9 is a flowchart representative of exemplary operation of a coordinator device in performing a method for coordinated wireless network management in accordance with the disclosure.

Referring now to FIG. 9, a flowchart is provided of exemplary operation of a coordinator device in performing a method for coordinated wireless network management 900 in accordance with the disclosure. The method includes receiving, from a plurality of overlay access points, wireless operational parameters characterizing wireless operation of the plurality of overlay access points (stage 910). The method further includes generating, based upon the wireless operational parameters, suggested operational information for at least one of the plurality of overlay access points (stage 920). The suggested operational information is then sent to the overlay access point wherein the suggested operational information causes modification of a perceived value of at least one operational parameter of the overlay access point (stage 930). This perceived value is different from an actual value of the at least one operational parameter and causes a corresponding adjustment in an operational mode of the overlay access point.

In summary, the present disclosure pertains in part to a method of optimizing performance of a plurality of overlay access points. The method includes using at least one coordinator device to obtain present wireless operational parameters from the plurality of overlay access points. The at least one coordinator device comprising at least one processor and memory, the at least one coordinator device configured to input the present wireless operational parameters into at least one model of at least one overlay access point's local wireless environment, the at least one model comprising relative locations of the plurality of overlay access points, and present wireless communications modes used by the plurality of overlay access points.

The at least one coordinator device further configured to use the at least one model to create at least one theory of at least one preferred future wireless operational state of at least one overlay access point and to use the at least one theory to provide future wireless operational parameters to at least one overlay access point;

wherein each overlay access point is a wireless network access point configured for operation on unlicensed radio spectrum;

wherein each overlay access point is configured to negotiate or configure present wireless channel access parameters with local wireless devices, and other local overlay access points, and to provide network connectivity to at least the local wireless devices;

wherein at least some of the present or future wireless channel access parameters vary according to the overlay access point's local environment;

wherein upon receiving the future wireless operational parameters, the overlay access points use the future wireless operational parameters to increase a probability of the overlay access points operating according to the theory.

In one embodiment the overlay access points are hint-receptive overlay access points, configured for operation on the unlicensed radio spectrum without need for the future wireless operational parameters. The hint-receptive overlay access points may be further configured to negotiate or configure present wireless channel access parameters with any of the local wireless devices, local wireless legacy access points, and other local hint receptive overlay access points. At least some of the present wireless channel access parameters may be random or semi-random wireless channel access parameters with underlying noise levels that vary either randomly or semi-randomly according to a local environment of the hint-receptive overlay access points. Upon receiving the future wireless operational parameters as future wireless operational hints, the hint receptive overlay access points may use the future wireless operational hints to create a bias in the random or semi-random wireless channel access parameters so as to increase a probability of the hint-receptive overlay access points operating according to the theory.

The at least one model of the at least one overlay access point's local wireless environment may be a legacy device aware model further capable of modeling relative locations of at least one legacy access point, the at least one legacy access point not under control of the at least one coordinator device. The present wireless operational parameters from the plurality of overlay access points may further comprise information pertaining to signals obtained from at least one legacy access point.

The coordinator device may further use the present wireless operational parameters to deduce probable locations and present wireless communications modes used by the at least one legacy access point to update the at least one legacy device aware model for the at least one legacy access point. In addition, the legacy device aware model may be used to create at least one theory of at least one preferred future wireless operational state of at least one overlay access point.

The future wireless operational hints may create a bias in the random or semi-random wireless channel access parameters by any of increasing or decreasing the perceived noise or error rates associated with wireless transmission or reception of signals by the hint-receptive overlay access points.

In one embodiment at least some of the plurality of overlay access points are MIMO overlay access points, each MIMO overlay access point comprising a plurality of antennas configured to produce at least one adjustable beam direction in response to MIMO configuration parameters. The present wireless operational parameters from at least one of the plurality of overlay access points may comprise new device detection parameters and new device direction parameters. The coordinator device and the model may be used to determine probable locations of the new device. The model and the probable locations may be used to adjust the at least one theory of at least one preferred wireless operational state of at least one overlay access point.

The at least one preferred operational state of at least one overlay access point may be an operational state in which the at least one adjustable beam direction is shifted from a present beam direction. The at least one adjustable beam direction may be shifted from a present beam direction to an alternative beam direction that performs at least one of reducing interference with at least one other local overlay access point and improving signal strength to at least one local wireless device. The at least one preferred operational state of the at least one overlay access point may be an operational state in which at least one adjustable beam direction from a first overlay access point, and at least one adjustable beam direction from a second overlay access point, are shifted so as to intersect with a probable location of a local wireless device. The future wireless operational parameters may be used to configure at least the first overlay access point and the second overlay access points to work together to provide network connectivity to the local wireless device.

In one embodiment the present wireless operational parameters further comprise any of present received wireless channel parameters, present transmitted wireless channel parameters, and present transmitter power parameters. The present wireless communications modes in the model may further comprise any of the present received wireless channel parameters, present transmitted wireless channel parameters, and present transmitter power parameters. The coordinator device and the model may be used to adjust the at least one theory of at least one preferred wireless operational state of at least one overlay access point for reduced interference with at least one other local overlay access point while maintaining connectivity with the local wireless devices.

The disclosure also relates to a coordinator device for a performance optimized overlay access point system operative in accordance with the preceding methods. The coordinator device may include at least one processor, a memory, and program code which when executed by the at least one processor causes the at least one processor to:

receive present wireless operational parameters from a plurality of overlay access points wherein each overlay access point comprises a wireless network access point configured for operation on unlicensed radio spectrum and wherein each overlay access point is configured to negotiate or configure present wireless channel access parameters with local wireless devices, and other local overlay access points, and to provide network connectivity to at least the local wireless devices;

use the present wireless operational parameters in at least one model of at least one overlay access point's local wireless environment, the at least one model comprising relative locations of the plurality of overlay access points, and present wireless communications modes used by the plurality of overlay access points;

create, using the at least one model, at least one theory of at least one preferred future wireless operational state of at least one overlay access point;

generate, using the at least one theory, future wireless operational parameters and provide the future wireless operational parameters to at least one overlay access point;

wherein at least some of the present or future wireless channel access parameters vary according to the overlay access point's local environment and wherein the model further is configured to handle situations where upon receiving the future wireless operational parameters, the overlay access points use the future wireless operational parameters to increase a probability of the overlay access points operating according to the theory.

The overlay access points may be hint-receptive overlay access points, configured for operation on the unlicensed radio spectrum without need for the future wireless operational parameters. The hint-receptive overlay access points are further configured to negotiate or configure present wireless channel access parameters with any of the local wireless devices, local wireless legacy access points, and other local hint receptive overlay access points. At least some of the present wireless channel access parameters may be random or semi-random wireless channel access parameters with underlying noise levels that vary either randomly or semi-randomly according to a local environment of the hint-receptive overlay access points. Upon receiving the future wireless operational parameters as future wireless operational hints, the hint receptive overlay access points may use the future wireless operational hints to create a bias in the random or semi-random wireless channel access parameters so as to increase a probability of the hint-receptive overlay access points operating according to the theory.

At least one model of the at least one overlay access point's local wireless environment may be a legacy device aware model that is further capable of modeling relative locations of at least one legacy access point, the at least one legacy access point not under control of the at least one coordinator device.

The present wireless operational parameters from at least one of the plurality of overlay access points may comprise new device detection parameters and new device direction parameters from MIMO overlay access points, each MIMO overlay access point comprising a plurality of antennas configured to produce at least one adjustable beam direction in response to MIMO configuration parameters. The coordinator device and the model are configured to determine probable locations of the new device, and to use the model and the probable locations to further adjust the at least one theory of at least one preferred wireless operational state of at least one overlay access point. The at least one preferred operational state of at least one MIMO overlay access point may be an operational state in which at least one adjustable beam direction is shifted from a present beam direction.

The overlay access points may report, to the coordinator device, present received wireless channel parameters, and are controlled by either present or future transmitted wireless channel parameters, and present or future transmitter power parameters. The present wireless operational parameters further comprise any of present received wireless channel parameters, present transmitted wireless channel parameters, and present transmitter power parameters. The coordinator device and the model are further configured to adjust the at least one theory of at least one preferred wireless operational state of at least one overlay access point for reduced interference with at least one other local overlay access point, while maintaining connectivity with the local wireless devices, by sending commands to the overlay access points controlling any of future transmitted wireless channel parameters and future transmitter power parameters.

In another aspect the disclosure is directed to an overlay access point device configured to be optimized by commands from a remote coordinator device. The overlay access device may include at least one processor and a memory containing program code which, when executed by the processor, causes the processor to:

negotiate or configure present wireless channel access parameters with local wireless devices, and other local overlay access points, and to provide network connectivity to at least the local wireless devices;

cause the overlay access point to transmit present wireless operational parameters to the at least one coordinator device wherein at least some of the present or future wireless channel access parameters vary according to a local environment of the overlay access point device;

receive future wireless operational parameters from the at least one coordinator device, wherein upon receiving the future wireless operational parameters, the overlay access points use the future wireless operational parameters to increase a probability of the overlay access points operating in a more optimal manner.

While various embodiments have been described above, it should be understood that they have been presented by way of example only, and not limitation. They are not intended to be exhaustive or to limit the claims to the precise forms disclosed. Indeed, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated.

Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The foregoing description, for purposes of explanation, used specific nomenclature to provide a thorough understanding of the claimed systems and methods. However, it will be apparent to one skilled in the art that specific details are not required in order to practice the systems and methods described herein. Thus, the foregoing descriptions of specific embodiments of the described systems and methods are presented for purposes of illustration and description. They are not intended to be exhaustive or to limit the claims to the precise forms disclosed; obviously, many modifications and variations are possible in view of the above teachings. The embodiments were chosen and described in order to best explain the principles of the described systems and methods and their practical applications, they thereby enable others skilled in the art to best utilize the described systems and methods and various embodiments with various modifications as are suited to the particular use contemplated. It is intended that the following claims and their equivalents define the scope of the systems and methods described herein.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded into one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for coordinated wireless network management, the method comprising:
    sending, from one of a plurality of overlay access points to a coordinator device, wireless operational parameters characterizing operation of the one of the plurality of overlay access points;
    receiving, at the one of the plurality of overlay access points, suggested operational information provided by the coordinator device wherein the suggested operational information causes modification of a perceived value of at least one operational parameter of the one of the plurality of overlay access points wherein the perceived value is different from an actual value of the operational parameter and wherein the at least one operational parameter comprises a wireless channel access parameter wherein the wireless channel access parameter is one of random and semi-random;
    using the suggested operational information to create a bias in the wireless channel access parameter, thereby causing the modification of the perceived value; and
    adjusting an operational mode of the one of the plurality of overlay access points based upon the perceived value.

2. The method of claim 1 wherein the adjusting is based at least in part upon a negotiation of wireless access parameters between the one of the plurality of overlay access points and one or more local wireless devices.

3. The method of claim 1 wherein the suggested operational information is generated based upon the wireless operational parameters and other wireless operational parameters received by other of the plurality of overlay access points.

4. The method of claim 1 wherein the bias corresponds to an increase or a decrease in perceived noise or error rates associated with wireless transmission or reception of signals.

5. The method of claim 1 wherein the coordinator device comprises a remote server in communication with the plurality of overlay access points over corresponding wired or wireless connections.

6. A method for coordinated wireless network management, the method comprising:
    sending, from one of a plurality of overlay access points to a coordinator device, wireless operational parameters characterizing operation of the one of the plurality of overlay access points;
    receiving, at the one of the plurality of overlay access points, suggested operational information provided by the coordinator device wherein the suggested operational information causes modification of a perceived value of at least one operational parameter of the one of the plurality of overlay access points wherein the perceived value is different from an actual value of the operational parameter;
    wherein the one of the plurality of overlay access points comprises a MIMO overlay access point including a plurality of antennas configured to produce a plurality of adjustable beam directions, the plurality of antennas producing one of the plurality of adjustable beam directions in response to MIMO configuration parameters included within the suggested operational information; and
    adjusting an operational mode of the one of the plurality of overlay access points based upon the perceived value.

7. The method of claim 6 further including receiving additional MIMO configuration parameters provided by the coordinator device, the plurality of antennas shifting the one of the plurality of adjustable beam directions in response to the additional MIMO configuration parameters so as to at least one of: (i) reduce interference with at least one of another of the plurality of local overlay access points, and (ii) improve signal strength to at least one local wireless device.

8. The method of claim 6 further including receiving additional MIMO configuration parameters provided by the coordinator device, the plurality of antennas shifting the one of the plurality of adjustable beam directions in response to the additional MIMO configuration parameters so as to intersect with a beam produced by another of the plurality of local overlay access points proximate a probable location of a local wireless device wherein the one of the plurality of overlay access points and the another of the plurality of local overlay access points cooperate to provide network connectivity to the local wireless device.

9. A method for coordinated wireless network management, the method comprising:
receiving, from a plurality of overlay access points, wireless operational parameters characterizing wireless operation of the plurality of overlay access points;
generating, based upon the wireless operational parameters, suggested operational information for at least one of the plurality of overlay access points; and
sending, to the at least one of the plurality of overlay access points, the suggested operational information wherein the suggested operational information causes modification of a perceived value of at least one operational parameter of the at least one of the plurality of overlay access points wherein the perceived value is different from an actual value of the at least one operational parameter;
wherein the at least one operational parameter comprises a wireless channel access parameter wherein the wireless channel access parameter is one of random and semi-random, and wherein the suggested operational information creates a bias in the wireless channel access parameter and thereby causes the modification of the perceived value;
wherein an operational mode of the at least one of the plurality of overlay access points is adjusted based at least in part upon the perceived value.

10. The method of claim 9 wherein the operational mode of the at least one of the plurality of overlay access points is adjusted based at least in part upon a negotiation of wireless access parameters between the at least one of the plurality of overlay access points and one or more local wireless devices, the plurality of overlay access points providing network connectivity to the one or more local wireless devices.

11. The method of claim 9 wherein the suggested operational information is further generated based upon other wireless operational parameters associated with one or more local wireless devices, the plurality of overlay access points providing network connectivity to the one or more local wireless devices.

12. The method of claim 9 wherein the bias corresponds to an increase or a decrease in perceived noise or error rates associated with wireless transmission or reception of signals.

13. The method of claim 9 wherein the plurality of overlay access points are configured to negotiate wireless channel access parameters with local wireless devices to which the plurality of overlay access points provide network connectivity, the at least one operational parameter being included among the wireless channel access parameters.

14. A method for coordinated wireless network management, the method comprising:
receiving, from a plurality of overlay access points, wireless operational parameters characterizing wireless operation of the plurality of overlay access points;
generating, based upon the wireless operational parameters, suggested operational information for at least one of the plurality of overlay access points; and
sending, to the at least one of the plurality of overlay access points, the suggested operational information wherein the suggested operational information causes modification of a perceived value of at least one operational parameter of the at least one of the plurality of overlay access points wherein the perceived value is different from an actual value of the at least one operational parameter;
wherein the at least one of the plurality of overlay access points comprises a MIMO overlay access point including a plurality of antennas configured to produce a plurality of adjustable beam directions, the plurality of antennas producing one of the plurality of adjustable beam directions in response to MIMO configuration parameters included within the suggested operational information;
wherein an operational mode of the at least one of the plurality of overlay access points is adjusted based at least in part upon the perceived value.

15. The method of claim 14 further including sending additional MIMO configuration parameters wherein the plurality of antennas are configured to shift the one of the plurality of adjustable beam directions in response to the additional MIMO configuration parameters so as to at least one of: (i) reduce interference with at least one of another of the plurality of local overlay access points, and (ii) improve signal strength to at least one local wireless device.

16. The method of claim 14 further including sending additional MIMO configuration parameters wherein the plurality of antennas are configured to shift the one of the plurality of adjustable beam directions in response to the additional MIMO configuration parameters so as to intersect with a beam produced by another of the plurality of local overlay access points proximate a probable location of a local wireless device.

17. A method for coordinated wireless network management, the method comprising:
receiving, from a plurality of overlay access points, wireless operational parameters characterizing wireless operation of the plurality of overlay access points;
generating, based upon the wireless operational parameters, suggested operational information for at least one of the plurality of overlay access points;
wherein the plurality of overlay access points comprise a plurality of MIMO network access points and wherein the wireless operational parameters include new device detection parameters and new device direction parameters associated with one or more local wireless devices;
determining probable locations of the one or more local wireless devices based upon the new device detection parameters and new device direction parameters; and
sending, to the at least one of the plurality of overlay access points, the suggested operational information wherein the suggested operational information causes modification of a perceived value of at least one operational parameter of the at least one of the plurality of overlay access points wherein the perceived value is different from an actual value of the at least one operational parameter;
wherein an operational mode of the at least one of the plurality of overlay access points is adjusted based at least in part upon the perceived value.

18. An overlay access point included within a plurality of overlay access points configured for communication with a coordinator device, the overlay access point comprising:
a processor;
a network communication unit in communication with the processor;
memory coupled to the processor, the memory including program code which when executed by the processor causes the processor to:

send, to the coordinator device, wireless operational parameters characterizing operation of the overlay access point;

receive suggested operational information provided by the coordinator device wherein the suggested operational information causes modification of a perceived value of at least one operational parameter of the overlay access point wherein the perceived value is different from an actual value of the operational parameter; and adjust an operational mode of the overlay access point based upon the perceived value; and a MIMO antenna array including a plurality of antennas configured to produce a plurality of adjustable beam directions, the plurality of antennas producing one of the plurality of adjustable beam directions in response to MIMO configuration parameters included within the suggested operational information.

19. The overlay access point of claim 18 wherein the program code further causes the processor to adjust the operation mode based at least in part upon a negotiation of wireless access parameters between the overlay access point and one or more local wireless devices.

20. An overlay access point included within a plurality of overlay access points configured for communication with a coordinator device, the overlay access point comprising:

a processor;

a network communication unit in communication with the processor;

memory coupled to the processor, the memory including program code which when executed by the processor causes the processor to:

send, to the coordinator device, wireless operational parameters characterizing operation of the overlay access point;

receive suggested operational information provided by the coordinator device wherein the suggested operational information causes modification of a perceived value of at least one operational parameter of the overlay access point wherein the perceived value is different from an actual value of the operational parameter and wherein the at least one operational parameter comprises a wireless channel access parameter wherein the wireless channel access parameter is one of random and semi-random;

use the suggested operational information to create a bias in the wireless channel access parameter, thereby causing the modification of the perceived value;

adjust an operational mode of the overlay access point based upon the perceived value.

21. A coordinator device configured for communication with a plurality of overlay access points, the coordinator device comprising:

a processor;

a network communication unit in communication with the processor; and memory coupled to the processor, the memory including program code which when executed by the processor causes the processor to:

receive, from the plurality of overlay access points, wireless operational parameters characterizing wireless operation of the plurality of overlay access points;

generate, based upon the wireless operational parameters, suggested operational information for at least one of the plurality of overlay access points wherein the suggested operational information causes modification of a perceived value of at least one operational parameter of the at least one of the plurality of overlay access points wherein the perceived value is different from an actual value of the at least one operational parameter; and send, to the at least one of the plurality of overlay access points, the suggested operational information;

wherein the at least one operational parameter comprises a wireless channel access parameter wherein the wireless channel access parameter is one of random and semi-random, and wherein the suggested operational information creates a bias in the wireless channel access parameter and thereby causes the modification of the perceived value;

wherein an operational mode of the at least one of the plurality of overlay access points is adjusted based at least in part upon the perceived value.

22. The coordinator device of claim 21, the program code further causing the processor to generate the suggested operational information based further upon other wireless operational parameters associated with one or more local wireless devices, the plurality of overlay access points providing network connectivity to the one or more local wireless devices.

* * * * *